United States Patent
Donahue et al.

(10) Patent No.: US 10,983,679 B2
(45) Date of Patent: Apr. 20, 2021

(54) SELECTIVELY ENABLING TRACKPAD FUNCTIONALITY IN GRAPHICAL INTERFACES

(71) Applicant: Adobe Inc., San Jose, CA (US)

(72) Inventors: Thomas T. Donahue, Carlsbad, CA (US); Richard Sinn, Milpitas, CA (US); Allan M. Young, Santa Rosa, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/726,909

(22) Filed: Oct. 6, 2017

(65) Prior Publication Data
US 2019/0107939 A1 Apr. 11, 2019

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0482* (2013.01); *G06F 3/04847* (2013.01);
(Continued)

(58) Field of Classification Search
CPC .............. G06F 3/04845; G06F 3/0482; G06F 3/04847; G06F 3/04883; G06F 40/109; G09G 5/24; G06N 20/00
See application file for complete search history.

(56) References Cited

U.S. PATENT DOCUMENTS

| 4,580,231 A | 4/1986 | Tidd |
| 5,099,435 A | 3/1992 | Collins |

(Continued)

FOREIGN PATENT DOCUMENTS

WO    WO2015117301    8/2015

OTHER PUBLICATIONS

Youtube, Project Faces—Adobe Max 2015—Sneak Peeks, Adobe Creative Cloud, https://www.youtube.com/watch?v=bcUo9ULvVq4, Oct. 9, 2015, Accessed Oct. 6, 2017, 2 pages.
(Continued)

*Primary Examiner* — Tadesse Hailu
(74) *Attorney, Agent, or Firm* — Kilpatrick Townsend & Stockton LLP

(57) ABSTRACT

A content manipulation application provides a graphical interface for editing graphical content. The graphical interface includes first and second control elements for performing first and second manipulations of the graphical content. If the first control element is selected, the content management application switches the graphical interface to a trackpad mode. The trackpad mode disables the second control element and thereby prevents the second control element from performing the second manipulation. While the graphical interface is in the trackpad mode, the content management application receives an input in an input area that lacks the first control element and performs the first manipulation of the graphical content responsive to receiving the input. Subsequent to the first manipulation being performed, the graphical interface is switched out of the trackpad mode, thereby enabling the second control element to perform the second manipulation.

20 Claims, 18 Drawing Sheets

(51) Int. Cl.
  *G06F 3/0482* (2013.01)
  *G09G 5/24* (2006.01)
  *G06N 20/00* (2019.01)
  *G06F 40/109* (2020.01)

(52) U.S. Cl.
  CPC ......... *G06F 3/04883* (2013.01); *G06N 20/00* (2019.01); *G09G 5/24* (2013.01); *G06F 40/109* (2020.01)

(56) References Cited

U.S. PATENT DOCUMENTS

| | | | |
|---|---|---|---|
| 5,490,241 A * | 2/1996 | Mallgren | G06F 3/04842 345/419 |
| 5,664,086 A * | 9/1997 | Brock | G06K 15/02 345/468 |
| 5,715,473 A * | 2/1998 | Reed | G06F 40/109 715/210 |
| 5,734,388 A | 3/1998 | Ristow | |
| 5,754,187 A | 5/1998 | Ristow | |
| 6,459,439 B1 * | 10/2002 | Ahlquist, Jr. | G06T 11/203 345/619 |
| 7,710,422 B2 * | 5/2010 | Matskewich | G09G 5/246 345/467 |
| 7,769,222 B2 * | 8/2010 | Blanford, Jr. | G01B 11/005 345/663 |
| 8,891,874 B1 | 11/2014 | Larson | |
| 2002/0033824 A1 * | 3/2002 | Stamm | G06F 40/109 345/471 |
| 2004/0205486 A1 | 10/2004 | Kurumida | |
| 2006/0017731 A1 * | 1/2006 | Matskewich | G09G 5/246 345/467 |
| 2008/0101682 A1 * | 5/2008 | Blanford | G01B 11/005 382/141 |
| 2009/0322687 A1 | 12/2009 | Duncan et al. | |
| 2010/0099463 A1 | 4/2010 | Kim et al. | |
| 2012/0092340 A1 * | 4/2012 | Sarnoff | G06T 11/203 345/420 |
| 2012/0235912 A1 | 9/2012 | Laubach | |
| 2013/0002573 A1 | 1/2013 | Baba | |
| 2013/0113717 A1 | 5/2013 | Van Eerd et al. | |
| 2014/0168119 A1 | 6/2014 | Esaki | |
| 2014/0176560 A1 * | 6/2014 | Mayot | G06T 11/203 345/442 |
| 2014/0347276 A1 | 11/2014 | Sakamoto et al. | |
| 2016/0328491 A1 * | 11/2016 | Hosch | G06F 17/50 |
| 2017/0084003 A1 * | 3/2017 | Parag | G06F 3/04842 |
| 2017/0255597 A1 | 9/2017 | Sinn | |
| 2018/0292953 A1 * | 10/2018 | Pandya | G06F 3/04847 |

OTHER PUBLICATIONS

Mathey, Yannick, et al., "Prototypo", https://www.prototypo.io/, May 2014, Accessed Oct. 6, 2017, 8 pages.
Macro, Ashleigh, "Adobe Gives a Sneak Peek at Future Apps & Amazing New Features for Photoshop", Digital Arts, http://www.digitalartsonline.co.uk/features/creative-software/adobe-gives-sneak-peek-at-future-apps-amazing-new-features-for-photoshop/, Oct. 7, 2015, Accessed Oct. 6, 2017, 7 pages.
Zajac, Filip, "Skeleton Type Design Explained", Letterrink, https://medium.com/letterink/skeleton-type-design-explained-d443f146de97, Feb. 26, 2016, Accessed Oct. 6, 201711 pages.
Clarke, Jamie, "How to Create Your Own Font: 18 Top Tips", Creative Bloq, http://www.creativebloq.com/typography/design-your-own-typeface-8133919, Jun. 28, 2017, 15 pages.
Font Lab, "Font Conversion and Linking" https://www.fontlab.com/, 2014, 5 pages.
Examination Report from related GB Application GB1812394.3 dated Jan. 31, 2019, 10 pages.
Great Britain Application No. 1812394.3, Examination Report dated Sep. 1, 2020, 6 pages.

* cited by examiner

| WEIGHT | X | Y | EXPANSION ANGLE |
|---|---|---|---|
| 0 | ... | ... 504 | ... |
| 0.25 | ... | ... | ... |
| 0.5 | ... 502 | 19 | ... |
| 0.75 | ... | 19.5 | ... |
| 1 | 14 | 20 | ... |
| 1.25 | 15 | 20.5 | ... |
| 1.5 | 16 | 21 | ... 506 |
| 1.75 | 17 | 21.5 | ... |
| 2 | 18 | 22 | 45 |
| 2.25 | 19 | 22.5 | 44.9 |
| 2.5 | 20 | 23 | 44.8 |
| 2.75 | 21 | ... | 44.7 |
| 3 | 22 | ... | 44.6 |
| 3.25 | 23 | ... | 44.5 |
| 3.5 | 24 | ... | ... |
| 3.75 | 25 | ... | ... |
| 4 | ... | ... | ... |

FIG. 5

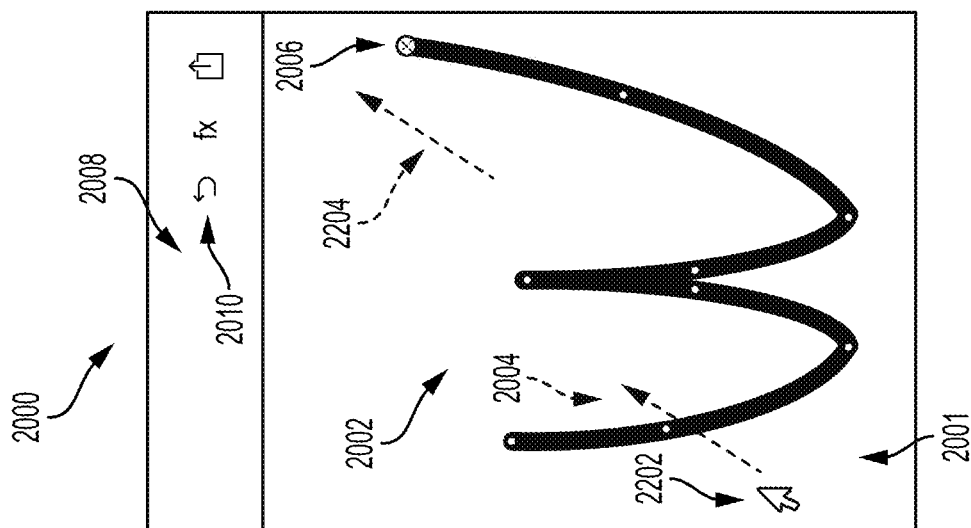
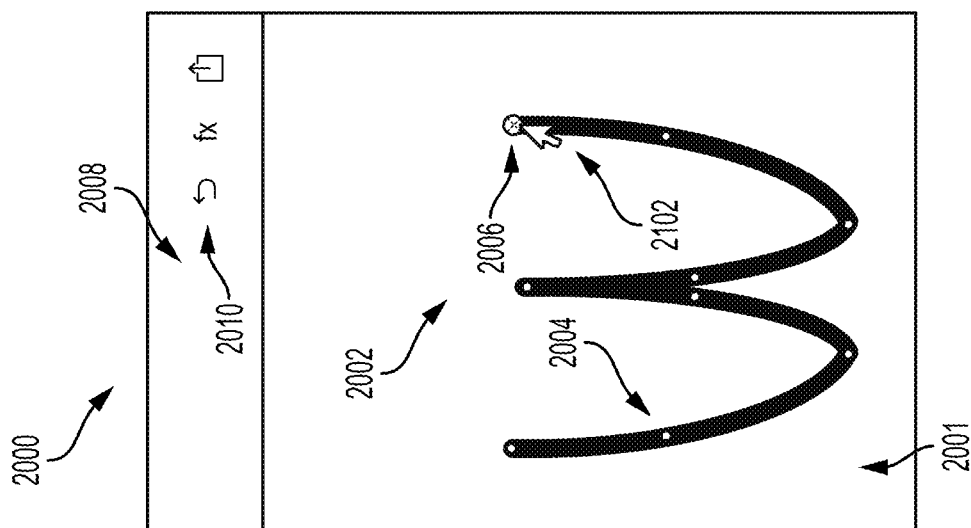
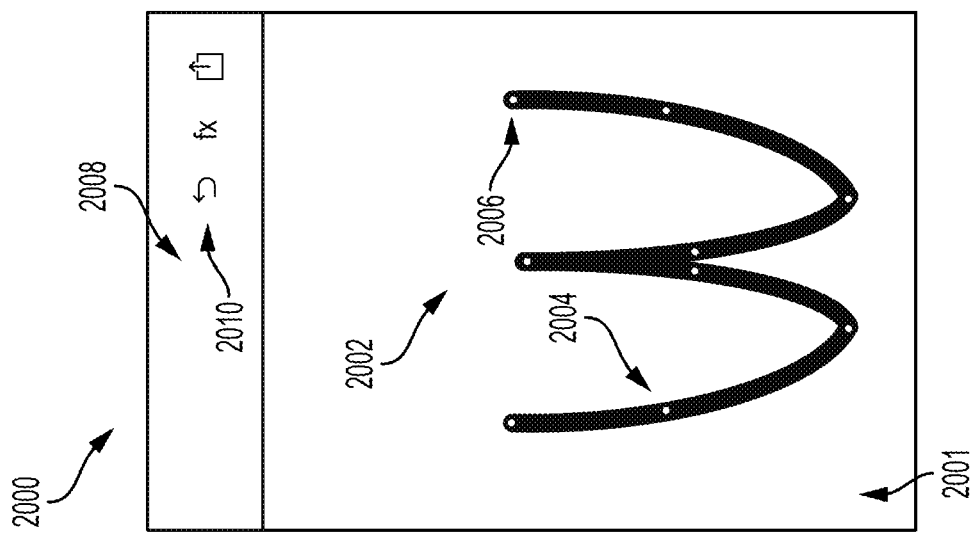

FIG. 23

| MENU | FROM | SUBJECT | RECEIVED |
|---|---|---|---|
| | TEST 1 | "DO YOU LIKE CATS?" | TODAY |
| | TEST 2 | "ALLOWABLE SUBJECT MATTER" | TODAY |
| | TEST 3 | "DEFINITELY ELIGIBLE" | YESTERDAY |
| | TEST 4 | "TUNA RECIPE" | YESTERDAY |

FIG. 24

| MENU | FROM | SUBJECT | RECEIVED |
|---|---|---|---|
| | TEST 1 | "DO YOU LIKE CATS?" | TODAY |
| | TEST 2 | "ALLOWABLE SUBJECT MATTER" | TODAY |
| | TEST 3 | "DEFINITELY ELIGIBLE" | YESTERDAY |
| | TEST 4 | "TUNA RECIPE" | YESTERDAY |

FIG. 25

SELECTIVELY ENABLING TRACKPAD FUNCTIONALITY IN GRAPHICAL INTERFACES

TECHNICAL FIELD

This disclosure relates generally to the functionality of graphical interfaces that are used to implement data-provision, commands, and other interactions with content management applications. More specifically, but not by way of limitation, this disclosure relates to selectively enabling trackpad functionality in graphical interfaces.

BACKGROUND

Content management applications are used to enhance or otherwise modify text, images, and other graphical content. Examples of content management applications include graphics-editing applications, text editors, image editors, etc. A content management application is often used to select certain graphical content and perform one or more manipulation of that graphical content. For instance, the content management application receives, via a graphical interface, an input selecting a certain shape and one or more additional inputs changing the position or size of that shape.

However, a size of the input received via a graphical interface negatively impacts the operations of the content management application. In one example, if a graphical interface is presented via a touch screen, then certain shapes or other graphical content could be inadvertently selected or manipulated. For instance, a content management application could be a typeface design application that is used to change how a font appears. A certain character from a font includes a collection of shapes (e.g., a bowl and a stem) that are manipulated by typeface design application. But if the bowl and the stem occupy an input area on the graphical interface that is smaller than a user's finger, a touch input that is intended to target only the stem could inadvertently select or manipulate the bowl (or vice versa).

Certain existing solutions for this issue present disadvantages. For instance, a user could magnify a certain portion of the graphical interface that includes the targeted graphical content (e.g., via a zoom command), then provide a touch input to the magnified portion of the graphical interface. But doing so may prevent a user from seeing the context of a resulting graphical manipulation. For instance, in the typeface-design example provided above, although a user could magnify the portion of the graphical interface that displays the stem of a character and then manipulate the stem in that magnified interface, this action could prevent the user from evaluating how manipulations to the stem would affect the overall appearance of the character (e.g., because other portions of the character are no longer displayed if the stem is magnified). For these and other reasons, existing graphical interfaces for content management applications present disadvantages.

SUMMARY

Certain embodiments involve selectively enabling trackpad functionality in graphical interfaces. For example, a content manipulation application provides a graphical interface for editing graphical content. The graphical interface includes first and second control elements for performing first and second manipulations of the graphical content. If the first control element is selected, the content management application switches the graphical interface to a trackpad mode. The trackpad mode disables the second control element and thereby prevents the second control element from performing the second manipulation. While the graphical interface is in the trackpad mode, the content management application receives an input in an input area that lacks the first control element and performs the first manipulation of the graphical content responsive to receiving the input. Subsequent to the first manipulation being performed, the graphical interface is switched out of the trackpad mode, thereby enabling the second control element to perform the second manipulation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 5 depicts an example in which different sets of control point values are computed using different scales and different ranges of weight parameter values via the process depicted in FIG. 2, according to certain embodiments of the present disclosure.

FIG. 20 depicts an example of a graphical interface for modifying a typeface design using the trackpad functionality from the process of FIG. 19, according to certain embodiments of the present disclosure.

FIG. 21 depicts an example in which the graphical interface of FIG. 20 is switched into a trackpad mode in accordance with the process of FIG. 19, according to certain embodiments of the present disclosure.

FIG. 22 depicts an example of modifying a typeface design using the trackpad functionality enabled in FIG. 21, according to certain embodiments of the present disclosure.

FIG. 23 depicts a graphical interface for an email client that uses the trackpad functionality from the process of FIG. 19, according to certain embodiments of the present disclosure.

FIG. 24 depicts an example in which the graphical interface of FIG. 23 is switched into a trackpad mode in accordance with the process of FIG. 19, according to certain embodiments of the present disclosure.

FIG. 25 depicts an example of manipulating email content using the trackpad functionality enabled in FIG. 24, according to certain embodiments of the present disclosure.

DETAILED DESCRIPTION

Figure 1:
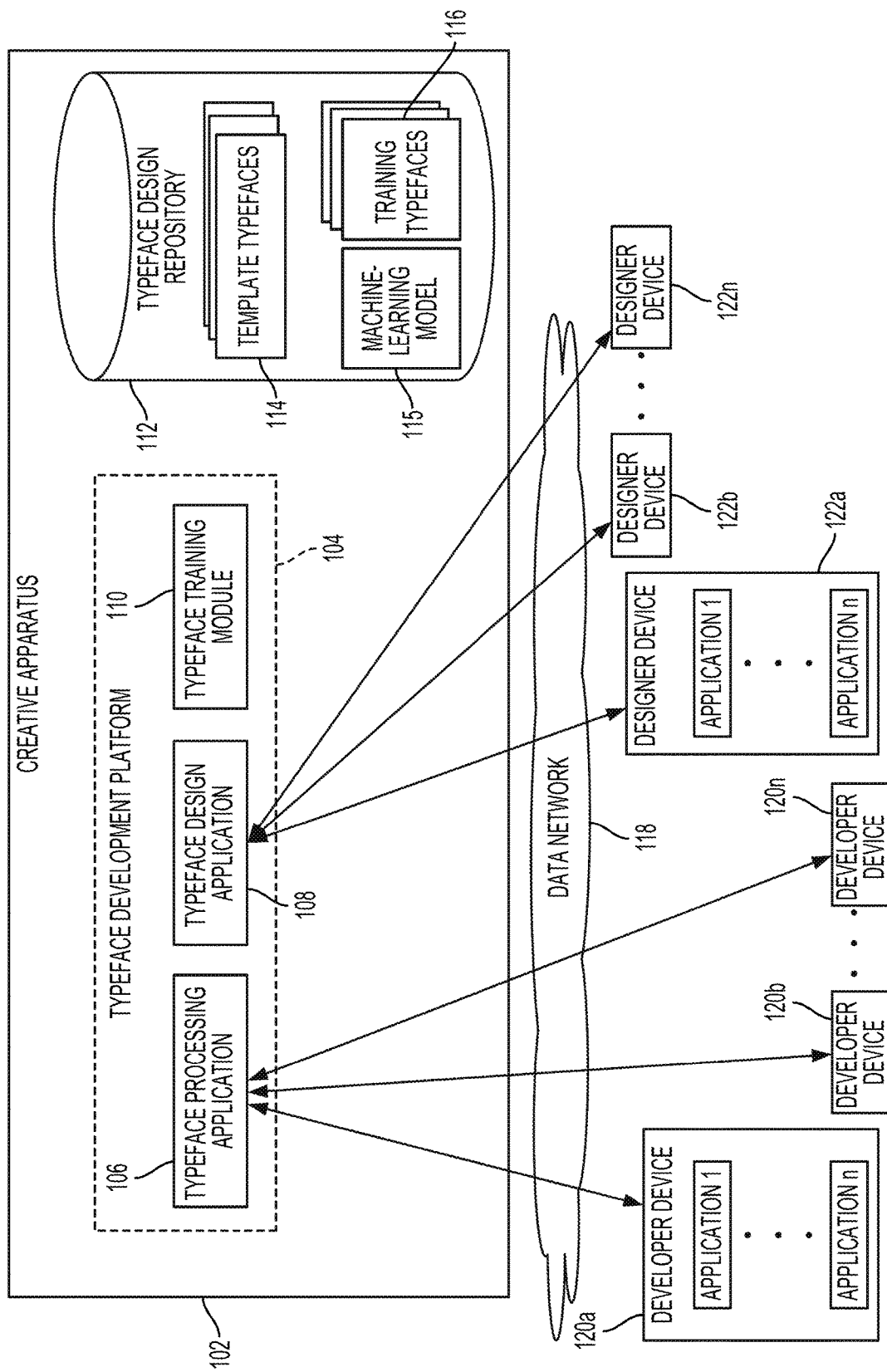
FIG. 1 depicts an example of an operating environment for implementing a typeface development platform, according to certain embodiments of the present disclosure.

Certain embodiments involve selectively enabling trackpad functionality in graphical interfaces. For example, a content management application temporarily switches a portion of a graphical interface into a "trackpad" mode, which disables certain control elements in the graphical interface and causes inputs received via the graphical interface to be applied only to the control elements that remain enabled.

The following non-limiting example is intended to introduce certain embodiments of a content management application that implements trackpad functionality in a graphical interface. In this example, a content management application provides a graphical interface for editing graphical content. The graphical interface includes various control elements for manipulating different portions of the graphical content. For instance, if the content management application is a typeface design application, the graphical interface is used to display a certain character being edited. The character includes graphical content, such as the various curves that define the character, and the graphical interface presents various control elements, such as control points positioned along the various. Moving a control point changes the length, curvature, or other attribute of the curve. To facilitate manipulations in accordance with a user's intent, the content management application switches the graphical interface to a trackpad mode. To do so, the content management application responds to a trackpad-enabling input, such as a selection of one control element, by disabling certain control elements and thereby prevents those control elements from performing manipulations of the graphical content. For instance, a typeface design application responds to the selection of a first control point, such as a control point along a stem of a character, by disabling a second control point, such as a control point along a bowl of the character, while the graphical interface is in a trackpad mode.

The trackpad mode allows inputs received in any trackpad region of the graphical interface to be applied to the active control element, thereby performing the manipulation of the graphical content in accordance with the inputs provided to the active control element. For instance, a dragging input received via the graphical interface is applied to the first control point of the character, even if that dragging input occurs in a region of the graphical interface that includes the second control point. The dragging input causes the first control point to be moved, thereby changing the design of the character. The content management application can subsequently switch the graphical interface out of the trackpad mode, thereby enabling one or more control elements that were disabled in the trackpad mode.

In some embodiments, the trackpad functionality described above allows for improved operation of graphical interfaces displayed on certain computing devices, such as tablet computers and smart phones. For instance, the trackpad functionality could enhance the operation of touch-based interfaces in which control elements (e.g., control points, buttons, selectable text, etc.) are smaller than the area occupied by a touch input (e.g., the size of a fingertip). If a particular control element in a given region of the graphical interface is selected, touch inputs can be received in any other trackpad-enabled region of the graphical interface. Thus, a particular control element can be manipulated without a touch input being positioned over the control element. A user can therefore see the results of the manipulation concurrently with the touch input being received.

Example of an Operating Environment

Referring now to the drawings, FIG. 1 depicts an example of an operating environment 100 for implementing one or more embodiments described herein. In this example, a creative apparatus 102 provides one or more content manipulation services, such as (but not limited to) a typeface development platform 104, via one or more data networks 118. The creative apparatus 102 executes suitable program code, such as various application or other software modules of a typeface development platform 104. The typeface development platform 104 includes executable code of different computing modules that perform one or more functions described herein. The executable code includes, for example, a typeface processing application 106, a typeface design application 108, and a typeface training module 110.

One or more of these modules uses data stored in a typeface design repository 112. The typeface design repository 112 includes one or more databases (or other suitable structures) stored in a data storage unit. Such a data storage unit can be implemented as one or more data servers. Examples of data stored in the typeface design repository 112 include one or more template typefaces 114, one or more machine-learning models 115, and one or more training typefaces 116.

The typeface processing application 106 is used to generate template typefaces 114 from input typeface designs. For instance, a template typeface 114 includes a set of characters having a particular design. In some embodiments, the design for each character is based on a skeleton of that character. The template typeface 114 also includes data that may be used by an end user to modify the design of one or more characters. One example of this data is parameter data. The datasets computed by the typeface processing application 106 allow a user to tune or otherwise modify the design of a template typeface 114 and thereby create a unique typeface suited to the user's purposes.

For instance, the typeface development platform 104 can be used to modify various typography parameters of a character, such as weight, width, contrast, oblique, curviness, x-height, taper, and tracking. The typeface development platform 104 can also be used to modify various serif parameters of a character, such as width, height, bracket radius, bracket angle and slab angle. The typeface processing application 106 computes various datasets corresponding to these parameters prior to the typeface development platform 104 being used to create a new typeface. The typeface processing application 106 computes, for each character in a template typeface 114, various ranges of values for each parameter. For instance, the typeface processing application 106 computes ranges of control point positions and corresponding curves for a range of weight values, a range of width values, etc. Detailed examples of operations performed by the typeface processing application 106 are described in further detail with respect to FIGS. 2-7.

The typeface design application 108 is used to manipulate graphical content via one or more graphical interfaces presented to an end user. In some embodiments, the typeface design application 108 performs one or more functions that allow users to create unique typefaces from one or more template typeface 114 (e.g., by selecting different combinations of parameter values pre-computed by the typeface processing application 106). For instance, the typeface design application 108 could provide touch-based interfaces to manipulate control points for characters in a typeface, to combine different parts of a character (e.g., component shapes such as bowls, stems, arms, legs, etc.), to link characters together for manipulations purposes, etc. Examples of operations performed by the typeface design application 108 are described in further detail herein. In some embodiments, the typeface design application 108 implements include a trackpad functionality described with respect to FIGS. 19-28.

In some embodiments, one or more applications included in the typeface development platform 104 use model-based machine-learning functions to guide or control how users modify typeface designs. For instance, the typeface training module 110 trains the machine-learning model 115 based on various training typefaces 116. Through the training process, the machine-learning model 115 learns how to recognize various characters across many different fonts. The trained machine-learning model 115 is provided to the typeface design application 108 (or other suitable module of the typeface development platform 104), which uses the trained machine-learning model 115 to automatically provide feedback to users regarding the aesthetic quality of different design changes. For instance, if a user-specified design change would render a character unrecognizable to the trained machine-learning model 115, the typeface development platform 104 could output a warning or other indicator to a user regarding the design change, or could simply reject the design change. Detailed examples of operations performed using the machine-learning model 115 are described in further detail herein with respect to FIGS. 12-18.

The creative apparatus 102 can be implemented using one or more servers, one or more processing devices, one or more platforms with corresponding application programming interfaces, cloud infrastructure, or the like. In addition, each module described herein can also be executed on one or more servers, one or more processing devices, one or more platforms with corresponding application programming interfaces, cloud infrastructure, or the like.

Some embodiments of the operating environment include user devices, which include developer devices 120a-n that access the typeface processing application 106 and designer devices 122a-n that access the typeface processing application 106. In some embodiments, the same user device can act as both a developer device and a designer device. Examples of a user device include, but are not limited to, a personal computer, tablet computer, a desktop computer, a processing unit, any combination of these devices, or any other suitable device having one or more processors. Each user device includes at least one application supported by the creative apparatus 102. User devices correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences. In one example, the developer devices 120a-n correspond to developers that use the typeface processing application 106 to generate graphics control data used by a typeface design application 108 to perform skeleton-based typeface design, as described in detail herein. In another example, the design devices 122a-n correspond to designers that use the typeface design application 108 to create custom typeface designs.

Digital tools, as described herein, include tools such as the typeface development platform 104 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

In this example, each of the user devices 120a-n is communicatively coupled to the creative apparatus 102 via one or more data networks 118. A user of a user device can use various products, applications, or services supported by the creative apparatus 102 via the data network 118. Examples of the data network 118 include, but are not limited to, the internet, a local area network, a wireless area network, a wired area network, a wide area network, and the like.

The example depicted in FIG. 1 is provided for illustrative purposes. However, other implementations, which may or may not implement certain features within the context of a typeface design, are possible. Any suitable software module can implement one or more operations described herein. For instance, text editors, email clients, graphic design programs, and other content management applications can apply the trackpad functionality described with respect to FIGS. 19-28 to other types of content in addition to or instead of typefaces.

Examples of Generating Graphics Control Data for Skeleton-Based Typeface Design

As described in detail with respect to the various examples below, the creative apparatus 102 is used for generating graphics control data for skeleton-based typeface design. For instance, the typeface design application 108 includes various design controls. Examples of these controls include design parameters that control visual attributes of a character's design, such as weight, width, contrast, obliqueness, curviness, x-height, taper, serif width, serif height, etc. These design parameters rely on graphics control data generated by the typeface processing application 106. The graphics control data is automatically generated based on developers tuning, via one or more development interfaces of the typeface processing application 106, various visual attributes of the graphics that comprise characters from typefaces. These graphics include curves defined by control points.

In some embodiments, the typeface processing application 106 receives inputs specifying how certain control points and curves should behave in response to exemplary values of a "weight" parameter (e.g., a minimum weight and a maximum weight). Based on these inputs, the typeface processing application 106 generates graphics control data that identifies a set of control point positions for a corresponding set of "weight" parameter values. The typeface processing application 106 repeats this process for one or more other design parameters of the typeface design application 108. The various sets of control points positions are included in graphics control data that is outputted from the typeface processing application 106 to the typeface design application 108 for use by designers.

Figure 2:
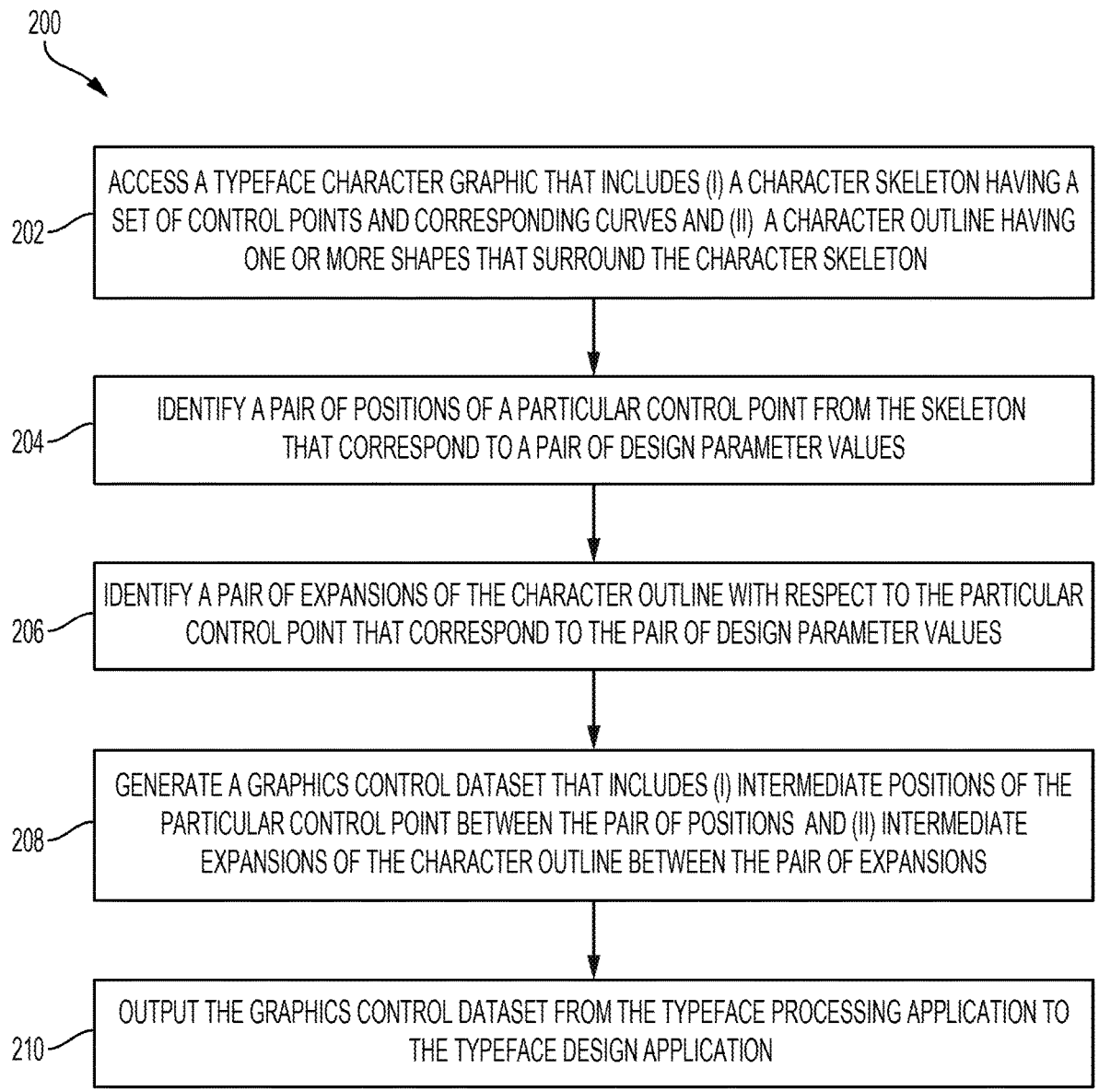
FIG. 2 depicts an example of a process for generating graphics control data used in performing skeleton-based modifications of a typeface design, according to certain embodiments of the present disclosure.

For example, FIG. 2 depicts an example of a process 200 for generating graphics control data used in performing skeleton-based modifications of a typeface design. In some embodiments, one or more processors of the creative apparatus 102, one or more developer devices 120a-n, or some combination thereof implement operations depicted in FIG. 2 by executing suitable program code, such as the typeface processing application 106 of the typeface development platform 104. For illustrative purposes, the process 200 is described with reference to certain examples depicted in the figures. But other implementations are possible.

At block 202, the process 200 involves accessing, from a typeface, a character graphic that includes a character skeleton having a set of control points and corresponding curves and that also includes a character outline having one or more shapes that surround the character skeleton. To implement block 202, the typeface processing application 106 retrieves the character graphic from a suitable non-transitory computer-readable medium, such as a local memory device on a computing device that executes the typeface processing application 106, a remote memory device accessible by such a computing device over a data network, or some combination thereof. The character graphic could be included in a set of character graphics from a template typeface 114. Each character graphic can include a set of control points that define one or more curves that provide the shapes of the character graphic.

In some embodiments, the creative apparatus 102 receives the character graphic from another computing device, such as a designer device associated with a typeface designer. In a simplified example involving one character, the typeface processing application 106 receives an input dataset that includes a character skeleton graphic for a "light" version of the character, a corresponding character outline graphic for the "light" version of the character, a character skeleton graphic for a "heavy" version of the character, and a corresponding character outline graphic for the "heavy" version of the character. The "light" graphics for the character (i.e., the character skeleton and character outline) can be manipulated by a developer or other user via the typeface processing application 106. The "heavy" graphics for the character (i.e., the character skeleton and character outline) are a designer-provided guide that allows a developer to visually inspect how far manipulations of the typeface design differ from an aesthetically desirable typeface design. In some embodiments, the "heavy" graphics are omitted.

Figure 3:
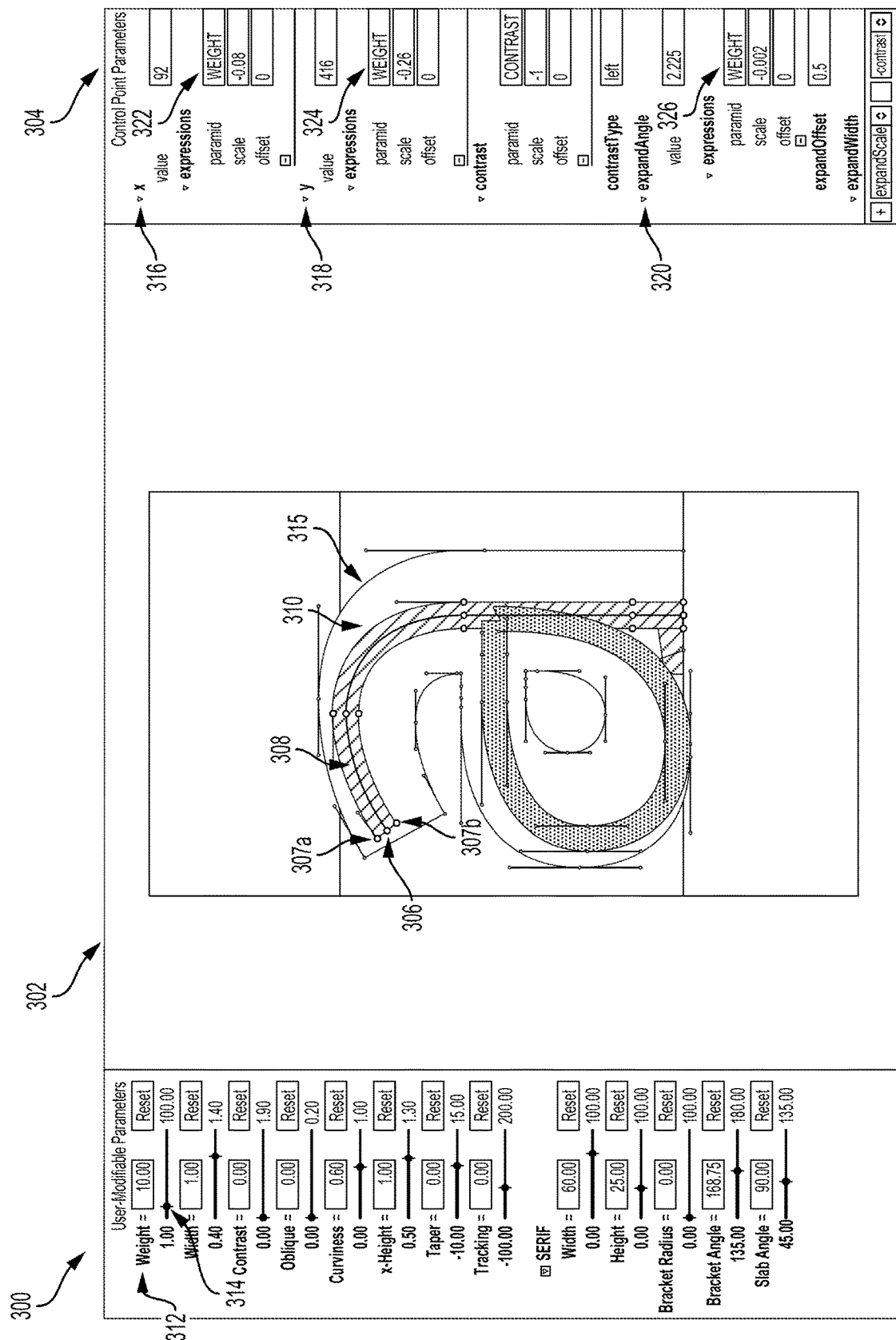
FIG. 3 depicts an example of a development interface used by a typeface processing application to compute control point parameters of a character for various design parameters available in a typeface design application, according to certain embodiments of the present disclosure.

FIG. 3 depicts an example of a development interface 300 used by the typeface processing application 106 to compute, from the input dataset, control point parameters 304 of a character for various design parameters 302 that can be manipulated in an end-user application (e.g., the typeface design application 108). In the example depicted in FIG. 3, a set of control points (including a particular control point 306) is connected by various curves. These curves are computed from the positions of the control points. The curves define a character skeleton 308. The character skeleton 308 is surrounded by a character outline 310. The character outline includes, for example, an additional set of control points (e.g., control points 307a and 307b on opposite sides of control point 306) connected by an additional set of curves. The additional set of curves defines the character outline 310.

In some embodiments, the sets of control points defining the character skeleton 308 and the character outline 310 can overlap. For instance, a control point 306 is included in a set of control points that define the character skeleton 308 and another set of control points that define the character outline 310.

The design parameters 302 are parameters from the typeface design application 108 that are tuned using the development interface 300 of the typeface processing application 106. Each of the design parameters 302 controls a certain aesthetic feature of the typeface design that can be controlled by a designer using the typeface development platform 104. For instance, a "weight" parameter can be a width of a character outline, an "x-height" parameter can be a vertical position of one or more horizontally oriented curves, etc.

A particular value of a weight parameter 312 is assigned by moving the slider 314. The weight parameter is associated with various control point parameters 304, such as an x-coordinate parameter 316, a y-coordinate parameter 318, and an expansion angle parameter 320. The mapping 322 indicates that the value of the x-coordinate parameter 316 of the control point 306 should be controlled, at least partially, by changes in the value of the weight parameter 312. Likewise, the mappings 324 and 326 mapping 322 indicate that the value of the y-coordinate parameter 318 and the expansion angle 320, respectively, should be controlled, at least partially, by changes in the value of the weight parameter 312.

In some embodiments, the development interface 300 also displays a guide 315 along with the character skeleton 308 and the character outline 310. The guide 315 could be, for example, a "heavy" version of a character outline provided by a designer device. The guide 315 is a visual aid that allows a developer to assess the appearance of different manipulations of the character skeleton 308, the character outline 310, or both. For instance, one or more control point parameters could be modified in a way that causes the character outline 310 to extend outside the guide 315. The developer could observe this effect and further tune the various control point parameters and their associated behavior so that the character outline 310 remains within the guide 315. In some embodiments, the guide 315 is omitted.

Returning to FIG. 2, the process 200 also involves computing, for a design parameter of a computer-implemented typeface design application, a set of intermediate character graphics based on a particular control point from the set of control points. For instance, the typeface processing application 106 computes intermediate graphics based on the control point parameters 304 that can be modified in the typeface processing application 106 (e.g., by a developer). The typeface processing application 106 generates the intermediate character graphics for a given design parameter by, for example, performing blocks 204, 206, and 208 of the process 200.

At block 204, the process 200 involves identifying a pair of positions of the particular control point that correspond, respectively, to a pair of design parameter values. The control point position identifies a location of a particular control point in a suitable plane or space. A control point position can be specified in any suitable manner. In some embodiments, a control point position is specified as a set of coordinates in a Cartesian plane or space (e.g., an x-y coordinate pair). In various other embodiments, a control point position could be modified using other coordinate systems (e.g., spherical coordinates, cylindrical coordinates, etc.).

In some embodiments, block 204 involves the typeface processing application 106 receiving, via a development interface 300, input data indicating one or more positions of a particular control point 306. The typeface processing application 106 also receives, via the development interface 300, input data indicating one or more parameter values of the design parameter. The typeface processing application 106 stores this control point data in a suitable memory device. In some embodiments, the control point data also includes values of the design parameter control point parameter values for certain specified values of the design parameter (e.g., a minimum or maximum value of the design parameter). The typeface processing application 106 identifies the pair of positions and corresponding parameter values at block 204 by referring to the stored control point data.

Figure 4:
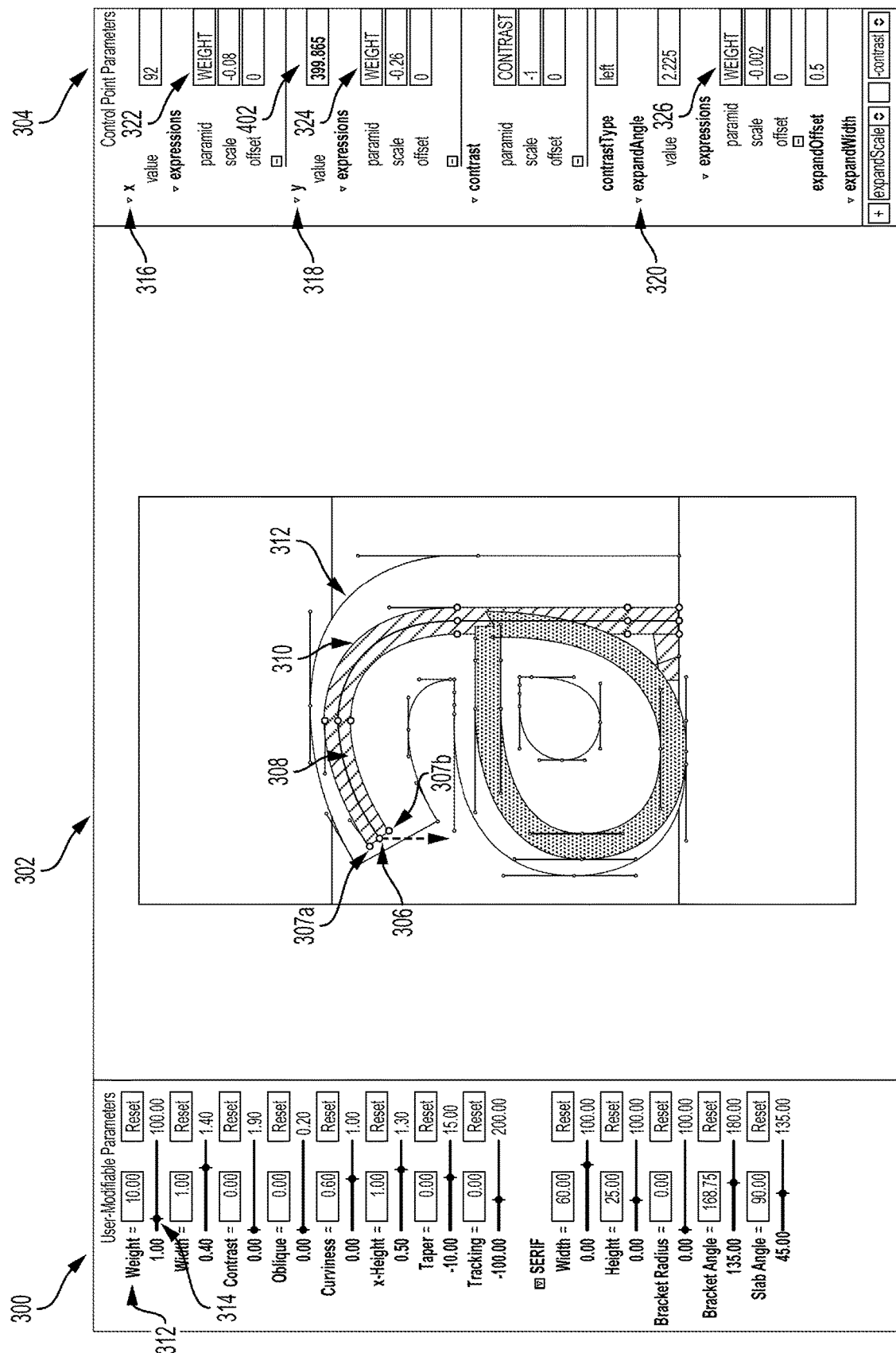
FIG. 4 depicts an example of control point position data that has been modified via the development interface of FIG. 3, according to certain embodiments of the present disclosure.

For instance, FIG. 4 depicts an example of position data that has been modified via the development interface 300. In this example, the typeface processing application 106 has received an input 402 decreasing the value of y-coordinate parameter 318. The typeface processing application 106 responds to the input 402 by lowering the control point 306, as indicated by the dashed arrow in FIG. 4. Modifying the position of the control point 306 also changes at least one curve of the character skeleton 308, such as the curve having the control point 306 as an end point. The typeface processing application 106 identifies a first parameter value for the weight parameter 312 based on the position of slider 314. For this first parameter value, the typeface processing application 106 also identifies a first control point position for the control point 306. The first control point position includes the value of the x-coordinate parameter 316 and the value of y-coordinate parameter 318, as modified by the input 402.

The typeface processing application 106 also identifies a second parameter value and control point position for one or more design parameters under consideration. In one example, the typeface processing application 106 receives a second input moving the slider 314 and thereby selecting a second parameter value for the weight parameter 312. The typeface processing application 106 could then receive one or more inputs modifying a position of the control point 306 while the slider 314 indicates this second weight parameter value. In another example, the typeface processing application 106 could use, as the second parameter value, a minimum or maximum value of the weight parameter 312 and a default control point position. For instance, an input dataset having a "light" version of the character graphic could include a default position of the control point 306 for a minimum parameter value. Additionally or alternatively, an input dataset having a "heavy" version of the character graphic could include a default position of the control point 306 for a maximum parameter value. At block 204, the typeface processing application 106 could identify, as the second parameter value, one or more of these minimum and maximum parameter values. The typeface processing application 106 could also identify, as the second control point position, one or more of the default control point positions from the "light" and "heavy" versions of the character graphic in the input dataset.

Returning to FIG. 2, at block 206, the process 200 involves identifying a pair of expansions of the character outline with respect to the particular control point that correspond, respectively, to the pair of design parameter values. In some embodiments, an expansion includes a width parameter, an angle parameter, or both. A first width or angle parameter value is identified for the first design parameter value, and a second width or angle parameter value is identified for the second design parameter value.

In some embodiments, a width parameter indicates a width of the character outline with respect to a particular control point. For instance, in FIGS. 3 and 4, the control points 307a and 307b define a width of the character outline 310 with respect to the control point 306. The typeface processing application 106 can determine, based on one or more user inputs (e.g., changes to a "scale" associated with the width parameter), that the width as defined by the control points 307a and 307b should change if the design parameter value changes. In these embodiments, an expansion of the character outline involves a respective rate at which the width of the character outline changes if the design parameter is changed.

In some embodiments, an angle parameter indicates an expansion angle of a character outline portion with respect to a particular control point. For instance, in FIGS. 3 and 4, the control points 307a and 307b define a curve that bisects the control point 306 at an angle of 2.225 degrees for a specified design parameter value. The typeface processing application 106 can determine, based on one or more user inputs (e.g., changes to a "scale" associated with the angle parameter), that this specified angle should change if the design parameter value changes. In these embodiments, an expansion of the character outline involves modifying this expansion angle in accordance with a certain scale. For instance, in the example of FIGS. 3 and 4, each incremental change in the weight parameter 312 causes a corresponding change of by 0.002 degrees in the angle of the curve defined by points 307a and 307b.

To implement block 204, the typeface processing application 106 receives, via a development interface, input data indicating various expansion-related values. The typeface processing application 106 stores the input data in a suitable memory device. The typeface processing application 106 identifies the pair of expansions and corresponding parameter values at block 204 by referring to the stored input data.

For instance, in the example depicted in FIGS. 3 and 4, the typeface processing application 106 could receive, via the development interface 300, one or more inputs indicating certain expansion data. Examples of this inputted expansion data include a specified expansion angle, a specified scale for an expansion angle, a specified expansion width, a specified scale for an expansion width, etc. In FIGS. 3 and 4, the typeface processing application 106 has received inputted expansion data indicating that, for the value of the weight parameter 312 indicated by the slider 314, the expansion angle with respect to the control point 306 is 2.225 degrees. The typeface processing application 106 has also received inputted expansion data indicating that each incremental change in the weight parameter 312 should modify the expansion angle with respect to the control point 306 by a scale of −0.002 degrees.

The typeface processing application 106 can also identify a second parameter value and expansion. In one example, the typeface processing application 106 could receive a second input moving the slider 314 and thereby selecting a second parameter value for the weight parameter 312. While the slider 314 indicates the second parameter value for the weight parameter 312, the typeface processing application 106 could receive one or more inputs modifying an expansion angle with respect to the control point 306, an expansion width with respect to the control point 306, or both. In another example, the typeface processing application 106 could use, as the second parameter value, a minimum or maximum value of the weight parameter 312 and a default expansion. For instance, an input dataset having a "light" version of the character graphic could include a default expansion angle and width with respect to the control point 306 for a minimum parameter value. Additionally or alternatively, an input dataset having a "heavy" version of the character graphic could include a default expansion angle and width with respect to the control point 306 for a maximum parameter value, or some combination thereof. At block 206, the typeface processing application 106 could identify, as the second parameter value, one or more of the minimum and maximum design parameter values. The typeface processing application 106 could identify, as the second expansion, one or more of the expansions (e.g., expansion angle, expansion width, etc.) from the "light" and "heavy" versions of the character graphic in the input dataset.

At block 208, the process 200 involves generating a graphics control dataset that includes (i) intermediate positions of the particular control point between the pair of positions and (ii) intermediate expansions of the character outline between the pair of expansions. To implement block 208, the typeface processing application 106 identifies a set of available design parameter values. The typeface processing application 106 also defines a range of positions bounded by the pair of positions and a range of expansions bounded by the pair of expansions. The typeface processing application 106 calculates, for each range, a set of values falling between the pair of positions and the pair of expansions.

In some embodiments, the typeface processing application 106 uses a scale associated with a control point parameter to compute a set of control point parameter values (e.g., intermediate positions). The scale indicates an interval between an adjacent pair of control point parameter values (e.g., two adjacent position coordinates, two adjacent expansion angles, two adjacent expansion widths, etc.) that corresponds to an adjacent pair of values of the user modifiable parameter. For instance, the weight parameter 312 could have a set of values w, such a [0, 1, 2, 3, 4]. The typeface processing application 106 can determine, based on one or more user inputs, that the x-coordinate parameter 316 for a particular control point 306 has a scale of 0.5 and specified value of 1 for $w_1=0$. Thus, the typeface processing application 106 computes an x-coordinate value of 1.5 for $w_2=1$, 2 for $w_3=2$, and so on until each value in the set w has a corresponding value of the x-coordinate parameter 316.

Although one control point parameter being varied is described above for illustrative purposes, multiple control point parameters are associated with a given design parameter. Each control point parameter's value can be independently varied with respect to the design parameter. For instance, FIG. 5 depicts an example in which different sets of control point values 502, 504, and 506 are computed using different scales and different ranges of weight parameter values. In this example, the x-coordinate parameter 316 for a control point 306 varies from 14 to 25 at a scale of 1 as the weight value increases from 0 to 3.75. The y-coordinate parameter 318 for the control point 306 varies they coordinate of the control point from 19 to 23 at a scale of 0.5 as the weight value increases from 0.5 to 2.5. The expansion angle 320 with respect to the control point 306 varies from 45 to 44.5 at a scale of −0.1 as the weight value increases from 2 to 3.25. In the resulting graphics control data generated by the typeface processing application 106, a weight value of 2 results in a control point position of (18, 22) with an expansion angle of 45 degrees, and a weight value of 2.5 results in a control point position of (20, 23) with an expansion angle of 44.8 degrees.

In additional or alternative embodiments, the typeface processing application 106 computes intermediate positions by interpolating between the pair of positions, intermediate expansions by interpolating between the pair of expansions, or both. The typeface processing application 106 determines that interpolation should be used based on receiving a pair of inputs. The pair of inputs includes a first input assigning one or more first control point parameter values to a first design parameter value. The pair of inputs also includes a second input that assigns one or more second control point parameter values to a second design parameter value. The first input indicates that the first control point parameter values should be used as one boundary of the interpolation, and the second input indicates that the second control point parameter values should be used as the other boundary of the interpolation.

As a simplified example, the pair of control point positions for a weight parameter 312 could be a first control point position (e.g., $(x_1, y_1)$) and a second control point position (e.g., $(x_2, y_2)$). The first control point positions is assigned, via user inputs to the development interface 300, as the minimum weight value. The second control point position (e.g., $(x_2, y_2)$) is assigned, via user inputs to the development interface 300, as the maximum weight value. Each intermediate point position is computed based on a where a weight value is located between the maximum and minimum weight values. For instance, if a weight value is between the minimum and maximum weight values, the typeface processing application 106 computes the halfway point $$\left(e.g., \left(\frac{x_1 + x_2}{2}, \frac{y_1 + y_2}{2}\right)\right)$$

between the first and second control point positions. Similarly, the pair of expansions for the weight parameter could include a first expansion angle $\theta_1$ for the minimum weight value and a second expansion angle $\theta_2$ for the maximum weight value. For a weight value between the minimum and maximum weight values, the typeface processing application 106 computes an angle $$\frac{\theta_1 + \theta_2}{2}$$

between the first and second expansion angles.

Figure 6:
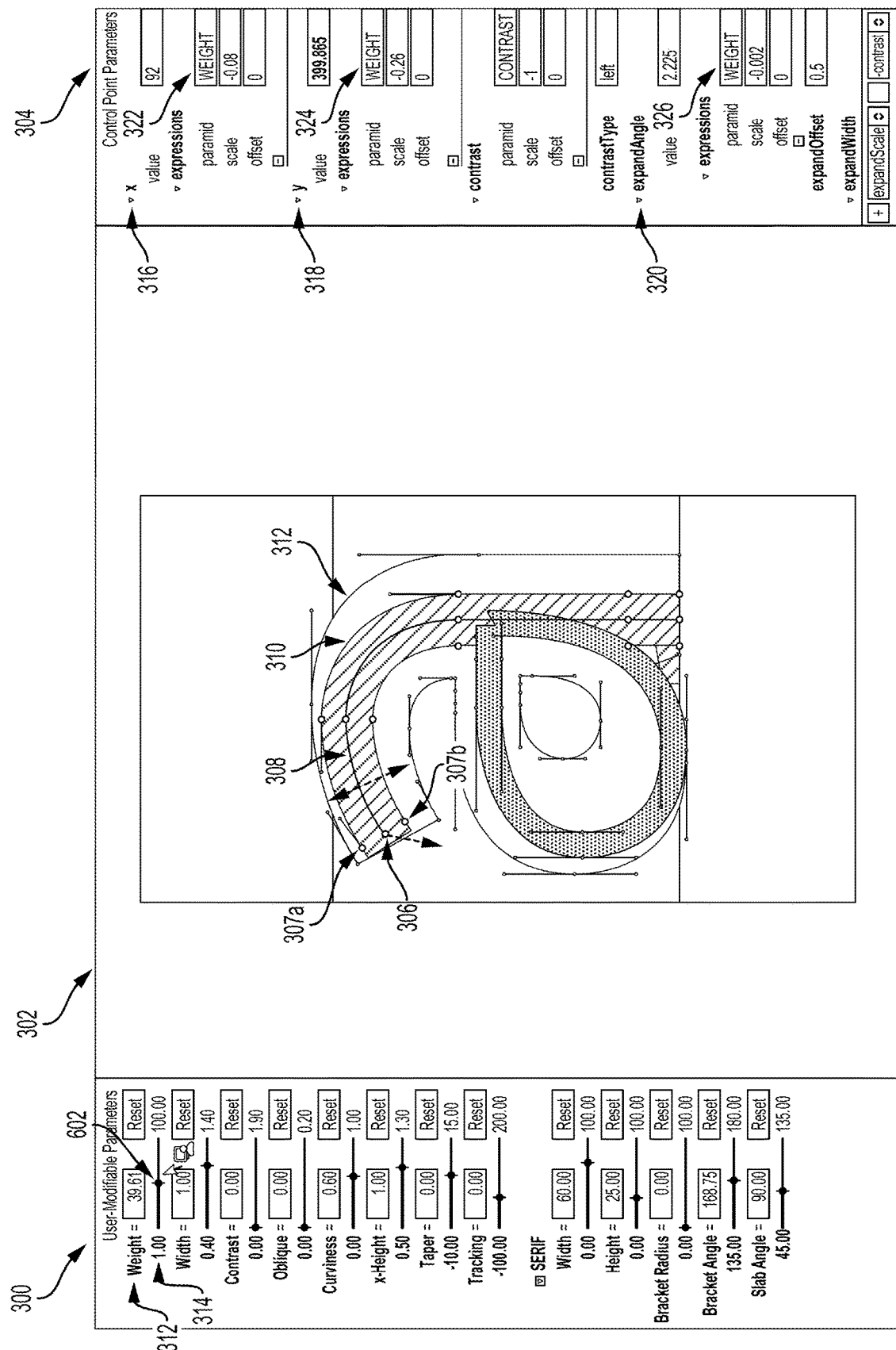
FIG. 6 depicts an example in which graphics control data generated via the process in FIG. 2 is used to generate a preview of a character design's behavior with respect to a design parameter, according to certain embodiments of the present disclosure.

In some embodiments, the typeface processing application 106 provide a preview function that displays the effect of changing a design parameter with a particular graphics control dataset. For instance, FIG. 6 depicts an example in which the slider 314 is moved to a new position 602 via one or more user inputs received via the development interface 300. Responsive to the slider 314 being moved, the typeface processing application 106 identifies a value of the weight parameter 312 that corresponds to the position 602. The typeface processing application 106 determines, from the graphics control data generated at block 208, that the control point 306 is associated with the weight parameter 312 and selects the control point parameter values that correspond to the identified value of the weight parameter 312. In this example, the x-coordinate parameter 316, the y-coordinate parameter 318, and the expansion angle parameter 320 are mapped to the weight parameter 312.

The typeface processing application 106 selects the respective values of these control point parameters and computes a new set of curves based on the control point parameter values. For instance, the control point 306 moves to a new position specified by the retrieved values of the x-coordinate parameter 316 and the y-coordinate parameter 318, as indicated by the downward unidirectional arrow in FIG. 6. Likewise, the control points 307a and 307b move to new positions in accordance with the retrieved value of the expansion angle, as indicated by the bidirectional arrow in FIG. 6. The typeface processing application 106 computes new curves based on the changes positions of the control points 306, 307a, and 307b, thereby modifying the shape of the character skeleton 308 and the corresponding shape of the character outline 310.

At block 210, the process 200 involves outputting the graphics control dataset from the typeface processing application 106 to the typeface design application 108. The typeface processing application 106 implements block 210 by causing the graphics control data to be stored in a location that is accessible by a typeface design application 108 of the typeface design application 108. In some embodiments, the typeface processing application 106 configures the creative apparatus 102 to store the graphics control data as part of a template typeface 114 in the typeface design repository 112. The graphics control data is accessible by the typeface design application 108 when the typeface design application 108 is used by one or more user devices 120a-n to create a new typeface from the template typeface 114. In additional or alternative embodiments, the typeface processing application 106 configures the creative apparatus 102 to transmit the graphics control data to one or more of computing devices that execute graphical design module (e.g., one or more user devices 120a-n executing a local typeface design application).

The typeface design application 108 having the outputted graphics control data can be accessed by one or more user devices 120a-n for creating a new typeface. For instance, the typeface design application 108 executes the typeface design application 108 to establish a session with a user device. The typeface design application 108 receives, during the session, a selection of a parameter values of the design parameter. The typeface design application 108 responds to the selection by displaying a modified character design of the character that includes modified curves generated from a portion of the graphics control dataset.

Figure 7:
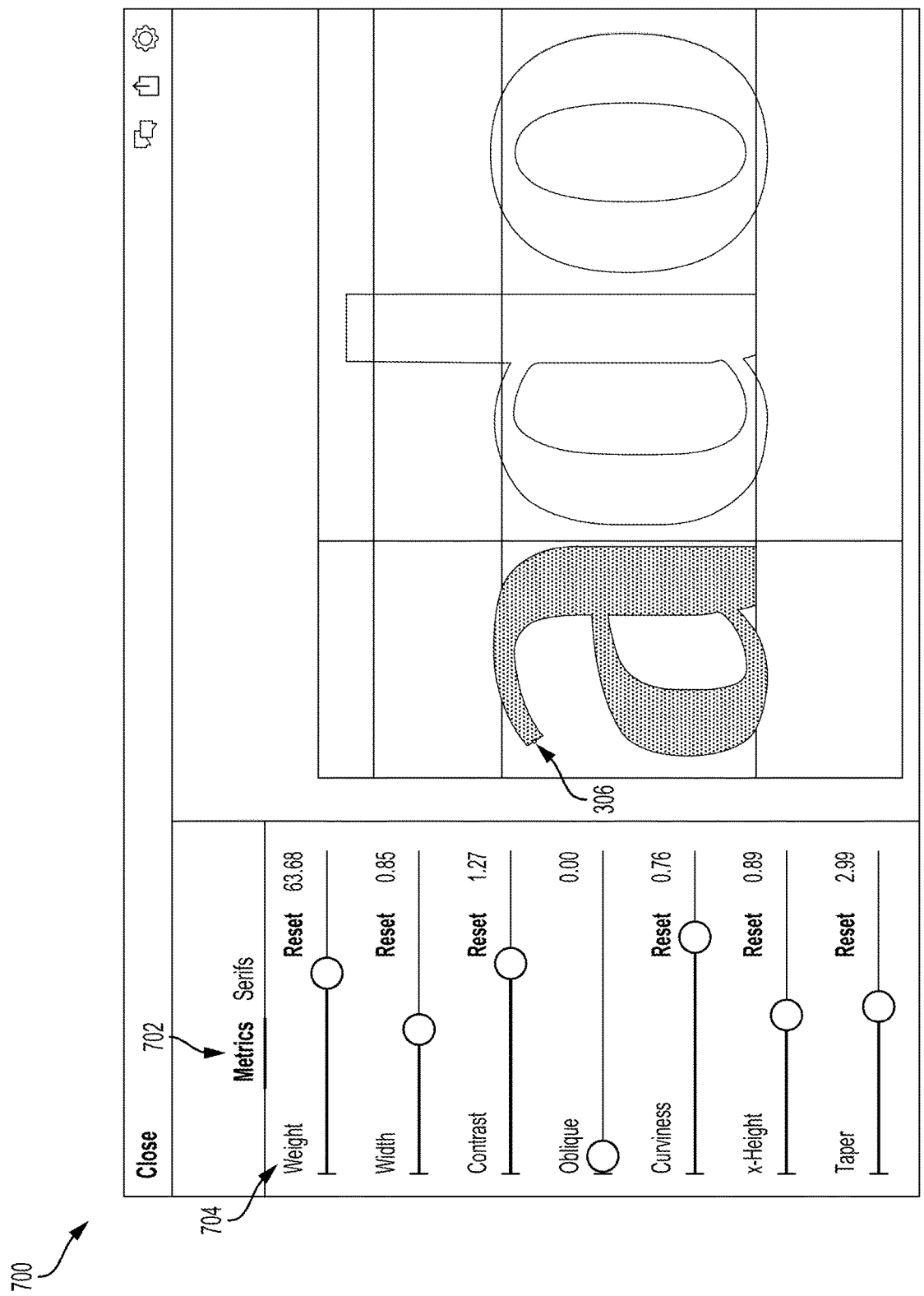
FIG. 7 depicts an example of a design interface from a typeface design application that uses the graphics control dataset outputted by the process of FIG. 2 to modify a typeface, according to certain embodiments of the present disclosure.

FIG. 7 depicts an example of a design interface 700 that is provided by the typeface design application 108 for modifying a typeface using a graphics control dataset outputted by the process 200. In this example, the design interface 700 displays a set of design parameters 702 (e.g., character metrics, character serifs, etc.). The design parameters 702 include one or more of the same design parameters that were used to generate the graphics control dataset. For instance, the design interface 700 includes a control element for modifying a weight parameter 704 of one or more characters (e.g., the "a" character) in a template typeface 114. Modifying the weight parameter 704 causes one or more control points of a character skeleton to be moved, one or more control points of a character outline to be moved, or both. The modified control point positions are determined based a portion of the graphics control dataset (i.e., certain control point parameter values associated with a particular weight value) in a manner similar to the example described above with respect to FIG. 6.

In some embodiments, the typeface design application 108 allows one or more typeface design aspects, such as the positions of a control point, to be manually changed via the design interface 700. For instance, the typeface design application 108 may allow one or more control points of the "a" character depicted in FIG. 7 to be moved without requiring a change in any of the design parameters 702. The typeface design application 108 responds to these movements of control points by modifying the graphics control dataset accordingly. In a simplified example, the graphics control dataset outputted at block 210 specifies that if a weight parameter value is set to 1, then the x coordinate of control point 306 is set to 5 and increments according to a scale of 0.5, as indicated in Table 1 below.

TABLE 1

| Control Point 306 | |
|---|---|
| Weight | x coordinate |
| 1 | 5 |
| 2 | 5.5 |
| 3 | 6 |

The typeface design application 108 may subsequently receive, via the design interface 700, a dragging input with respect to the control point 306 while the weight is set to 1. The dragging input increases the x coordinate by 2. The typeface design application 108 responds to this dragging input by re-computing one or more graphics control datasets that involve the x coordinate of the control point 306. For instance, in Table 2 below, a weight parameter value of 1 corresponds to an x coordinate of 7, which then increments according to a scale of 0.5.

TABLE 2

| Control Point 306 | |
|---|---|
| Weight | x coordinate |
| 1 | 7 |
| 2 | 7.5 |
| 3 | 8 |

For illustrative purposes, the operations of process 200 are described above with respect to a single control point and a single design parameter. But the operations described above can be applied to multiple control points and multiple design parameters. In one example, the typeface processing application 106 could be used to map the weight parameter 312 to control point parameters of one or more additional control points along the character skeleton 308. Thus, the graphics control data includes, for each additional control point, one or more sets of control point parameter values that correspond to respective values of the weight parameter 312.

In another example, the typeface processing application 106 could be used to map multiple design parameters 302 to a particular control point 306. For instance, both a "curviness" parameter and a "weight" parameter can be assigned to a control point parameter (e.g., x coordinate, y coordinate, expansion angle, etc.) of a particular control point 306. The typeface processing application 106 computes a first set of control point parameter values (e.g., a first set of x coordinate values) for the first design parameter (e.g., the "curviness" parameter) by performing operations from one or more of blocks 202-208. The typeface processing application 106 computes a second set of control point parameter values (e.g., a second set of x coordinate values) for the second design parameter (e.g., the "weight" parameter) by performing operations from one or more of blocks 202-208.

In some embodiments, the first and second sets of control point parameter values can be computed with a common scale. Thus, in the present example, both an incremental change in the curviness parameter and an incremental change in the weight parameter results in the control point being moved the same horizontal distance. In additional or alternative embodiments, the first and second sets of control point parameter values can be computed with different scales specifying different intervals between adjacent pairs of control point parameter values. Thus, in the present example, an incremental change in the curviness parameter results in the control point being moved a horizontal distance that is different from the horizontal distance associated with an incremental change in the weight parameter.

Mapping multiple design parameters to a given control point can potentially create conflicts with respect to the control point when computing a curve to be displayed in the development interface 300, the design interface 700, or both. In a simplified example, Table 3 depicts sets of x coordinate values of the control point 306 for the curviness parameter and the weight parameter.

TABLE 3

| Control Point 306 | | | |
|---|---|---|---|
| Curviness | | Weight | |
| User parameter value | x coordinate | User parameter value | x coordinate |
| 1 | 2 | 1 | 2 |
| 2 | 4 | 2 | 2.5 |
| 3 | 6 | 3 | 3 |

In this example, the two sets of sets of x coordinate values are generated using different scales. Thus, although the same x coordinate is used if both the curviness parameter and the weight parameter are set to "1," different x coordinates result from the curviness parameter and the weight parameter having different values (e.g., a curviness of 3 and a weight of 1) or even the same values (e.g., a curviness of 2 and a weight of 2).

One or more modules of the typeface development platform 104 (e.g., the typeface processing application 106, the typeface design application 108, etc.) resolve these potential conflicts by using a combined control point parameter value for a particular set of user parameters values of design parameters. For instance, the typeface development platform 104 receives a first user parameter value for the first design parameter (e.g., a curviness of 3) and a second user parameter value for the second design parameter (e.g., a weight of 1). The typeface development platform 104 selects a first control point parameter value corresponding to the first user parameter value and a second control point parameter value corresponding to the second user parameter value. The first control point parameter value is selected from the graphics control data (e.g., a set of intermediate positions, a set of intermediate expansions, etc.) that specifies characteristics of the control point with respect to the first design parameter (e.g., an x coordinate of 6 for a curviness of 3). The second control point parameter value is selected from the graphics control data (e.g., a set of intermediate positions, a set of intermediate expansions, etc.) that specifies characteristics of the control point with respect to the second design parameter (e.g., an x coordinate of 2 for a weight of 1).

The typeface development platform 104 computes a combined control point parameter value from the first and second control point parameter values. Examples of computing a combined control point include averaging the first and second control point parameter values, computing a weighted average of the first and second control point parameter values, etc. The typeface development platform 104 assigns the combined control point parameter value to the particular control point and computes a modified curve from the particular control point having the combined control point parameter value. For instance, in the present example, the control point 306 could be assigned an x coordinate of 4 (i.e., the average of 6 and 2) if the curviness parameter is set to 3 and the curviness parameter is set to 1. The typeface development platform 104 modifies the character skeleton computing a new curve defined by the control point 306 having the x coordinate of 4.

In some embodiments, the typeface development platform 104 permits feedback to be provided from one or more designer devices 122*a-n* using the typeface design application 108 to one or more developer devices 120*a-n* using the typeface processing application 106. For instance, the typeface design application 108 could perform one or more comment capture operations with respect to the design of one or more characters. The comment capture operation involves receiving a comment input indicating a portion of the character that includes one or more control points.

For instance, the typeface design application 108, during a session between the creative apparatus 102 and a designer device, could receive a comment input via the design interface 700. The comment input could identify a portion of the "a" character, such as a character skeleton portion that includes the control point 306, a character outline portion computed based on the control point 306, or some combination thereof. The typeface design application 108 responds to the comment input by capturing comment data. For instance, during the comment input, the typeface design application 108 receives and stores, in a memory device, one or more current values of one or more design parameters. The typeface design application 108 also receives and stores a corresponding character graphic for the current design parameter values. The corresponding character graphic is generated from graphics control data selected by the typeface design application 108 in response to the current design parameter values being selected. An example of such a character graphic is a certain character outline portion. The typeface design application 108 stores the comment data (e.g., the design parameter values and corresponding character graphic) in a memory location accessible to the typeface processing application 106.

The typeface design application 108 also executes one or more functions (e.g., inter-process communications) notifying the typeface processing application 106 that the comment data is available. The typeface processing application 106 responds to this notification by making the comment data available to one or more developer devices 120*a-n*. For example, the typeface processing application 106 configures the creative apparatus 102 to transmit the comment data to a developer device, to transmit a user notification to a developer device that the comment data is available, or some combination thereof. The developer device can access the comment data from the typeface processing application 106 and use the comment data to update the graphics control data for the character.

Link-Based Modifications of Typeface Design

In some embodiments, the typeface development platform 104 is used to link character design modifications for different characters of a typeface. For instance, the typeface development platform 104 creates a mapping between control points of different characters in a typeface. The mapping is created based on, for example, one or more user inputs that specify at least two characters to be linked and that are received via a suitable graphical interface (e.g., the development interface 300, the design interface 700, etc.). In the mapping, a first control point from a first character is linked to a second control point via of a second character. The mapping indicates a similarity between a first component shape from the first character and a second component shape from the second character.

Figure 8:
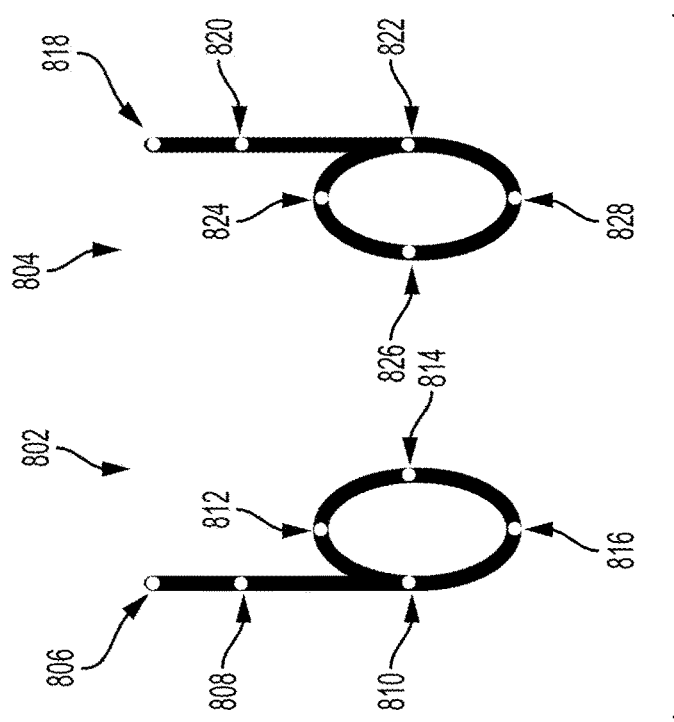
FIG. 8 depicts examples of character skeletons for characters that can be mapped to one another for performing linked design modifications, according to certain embodiments of the present disclosure.

For instance, FIG. 8 depicts examples of character skeletons for characters 802 and 804 (e.g., a "b" and a "d" of a certain template typeface 114). The character 802 includes two component shapes: a stem that includes curves defined by the control points 806, 808, and 810; and a bowl that includes the curves defined by the control points 810, 812, 814, and 816. The character 804 also includes two component shapes: a stem that includes curves defined by the control points 818, 820, and 822; and a bowl that includes the curves defined by the control points 822, 824, 826, and 828.

Figure 9:
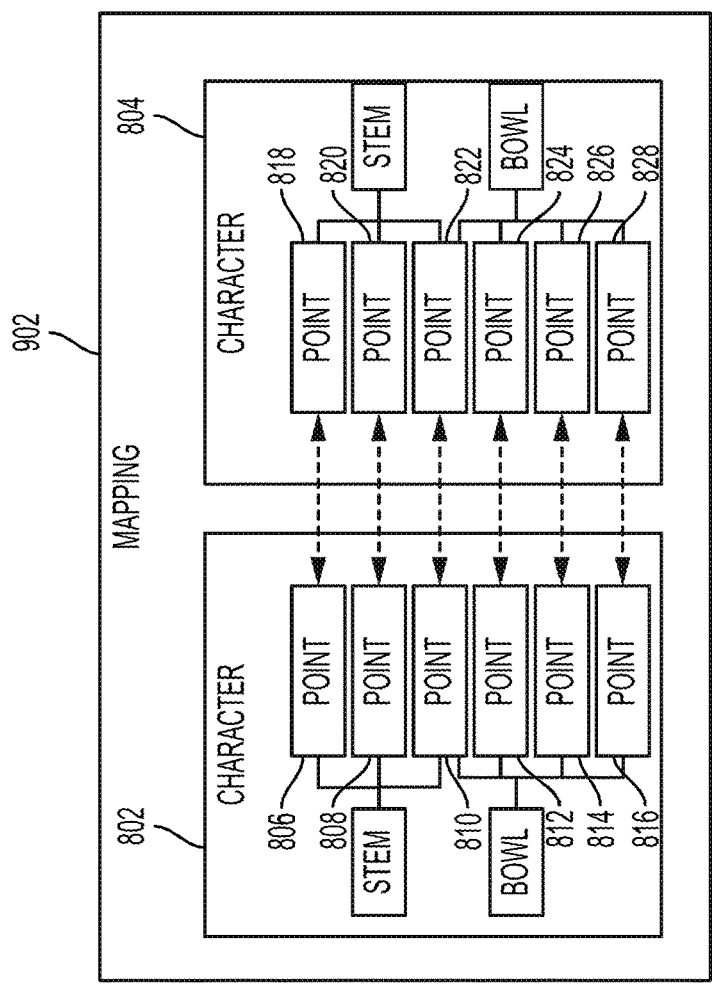
FIG. 9 depicts examples of a mapping that links component shapes of the characters in FIG. 8 based on their character skeletons, according to certain embodiments of the present disclosure.

In this example, the typeface development platform 104 is used to generate a mapping 902, as depicted in FIG. 9. The mapping 902 includes associations (represented by bidirectional arrows) between pairs of control points from the characters 802 and 804. For example, the two stems are linked via the mapping 902, which associates points 806 and 818, points 808 and 820, and points 810 and 822. Similarly, the mapping 902 links the bowls via associations between the various control points that define the curves of the bowls.

Figure 10:
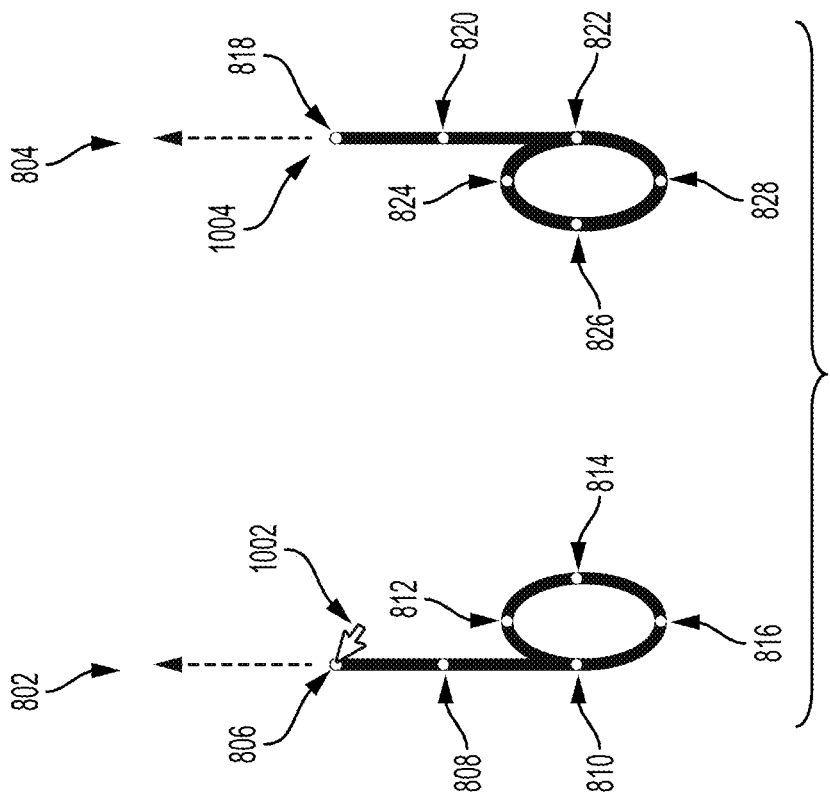
FIG. 10 depicts an example in which a modification to a component shape of a first character is applied to a linked component shape of a second character, according to certain embodiments of the present disclosure.

The mapping 902 permits a change in one of the component shapes (e.g., a bowl of the character 802) to be applied to a corresponding component shape (e.g., a bowl of the character 802). For instance, FIG. 10 depicts an example in which a change in a stem length from a character 802 is also applied to a stem length from a character 804. The typeface development platform 104 receives an input 1002 that moves the control point 806. Responsive to receiving the input 1002, the typeface development platform 104 determines, by reference to the mapping 902, that the control point 806 is mapped to the control point 818. The typeface development platform 104 applies, based on the mapping between the control points 806 and 818, a corresponding modification 1004 to the character 804. For instance, if the input 1002 changes a y coordinate of the control point 806, the modification 1004 includes an equal or proportional change in a y coordinate of the control point 818.

Figure 11:
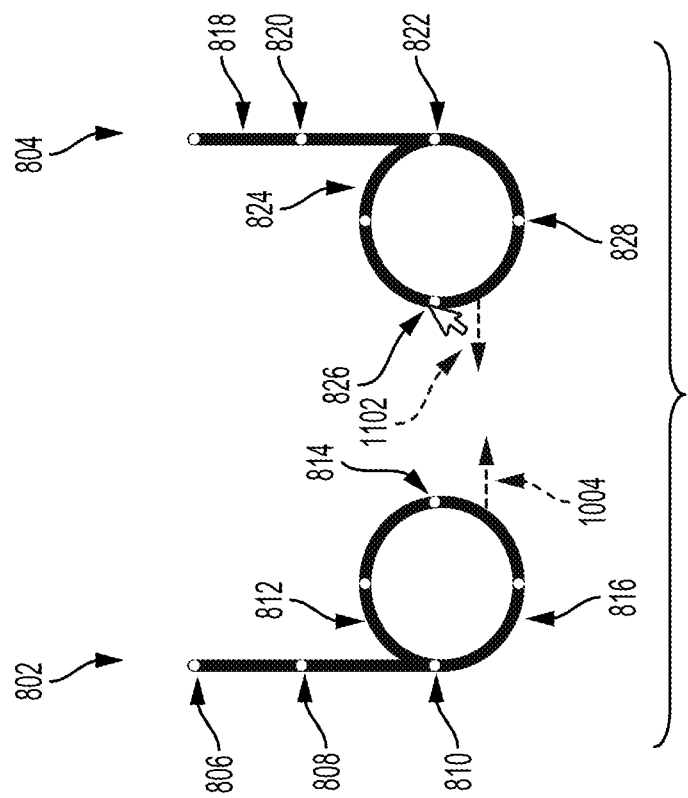
FIG. 11 depicts another example in which a modification to a component shape of a first character is applied to a linked component shape of a second character, according to certain embodiments of the present disclosure.

FIG. 11 depicts an example in which a change in a bowl length from a character 802 is also applied to a bowl length from a character 804. The typeface development platform 104 receives an input 1102 that moves the control point 826. Responsive to receiving the input 1102, the typeface development platform 104 determines, by reference to the mapping 902, that the control point 826 is mapped to the control point 814. The typeface development platform 104 applies, based on the mapping between the control points 826 and 814, a corresponding modification 1104 to the character 804. For instance, if the input 1102 changes a magnitude of the x coordinate of the control point 826, the modification 1104 includes an equal or proportional change a magnitude of the x coordinate of the control point 814.

In some embodiments, the typeface development platform 104 stores, in a mapping 902 or other suitable data structure, an orientation of each component shape of a character. For instance, the typeface design application stores data indicating that the stems of characters 802 and 804 are oriented at an angle of 90 degrees with respect to a horizontal axis, the bowl of the character 802 is oriented at an angle of 0 degrees with respect to the horizontal axis, and the bowl of the character 804 is oriented at an angle of 180 degrees with respect to the horizontal axis. To apply the changes in FIGS. 10 and 11, the typeface development platform 104 uses the stored orientations. For instance, in FIG. 10, since the stems of characters 802 and 804 are both oriented at an angle of 90 degrees, the modification 1004 moves the control point 818 in that direction. In FIG. 11, the input 1102 moves the control point 826 a certain distance at an angle of 180 degrees (i.e., the orientation of the bowl of the character 804). But the corresponding modification 1104 moves the control point 814 a certain distance at an angle of 90 degrees (i.e., the orientation of the bowl of the character 802).

Although FIGS. 10 and 11 depict examples in which component shapes are modified via movements to control points, any suitable modifications may be used. For example, a change in an expansion of a first component shape (e.g., a change in expansion width, a change in expansion angle, etc.) can result in a corresponding change in an expansion of the second component shape (e.g., an equal or proportional change in expansion width, an equal or proportional change in a magnitude of the expansion angle, etc.).

In some embodiments, the changes in control point positions, expansions, etc. may result from user inputs that modify one or more design parameters described above with respect to FIGS. 2-7. For instance, a weight parameter value could be modified for a first character via the design interface 700, thereby causing the typeface development platform 104 to change a control point parameter (e.g., a position of a control point, an expansion of the control point, or both). Changing the control point parameter could involve selecting, from the graphics control dataset outputted by the process 200, an intermediate control point parameter value (e.g., an intermediate position or expansion) corresponding to the modified value of the design parameter. The typeface development platform 104 applies a corresponding change to a second component shape from a linked character. In some embodiments, applying the corresponding change could involve selecting, from the graphics control dataset, an intermediate control point parameter value of a linked control point, where this intermediate control point parameter value also corresponds to the modified value of the design parameter. The typeface development platform 104 updates the design of each linked character by computing one or more new curves based on the control points having modified control point parameter values (e.g., control point parameter values that include or are derived from the selected control point parameter values).

In some embodiments, the typeface development platform 104 performs one or more validation operations when generating a mapping between characters. For instance, the typeface development platform 104 receives one or more inputs that include a request to map a first component shape from a first character to a second component shape from a second character. The typeface development platform 104 validates the requested mapping based on one or more attributes of the two characters.

In one example, the typeface development platform 104 compares the component shapes. If the component shapes are sufficiently similar (e.g., two bowls), the typeface development platform 104 performs the requested mapping. If the component shapes are insufficiently similar (e.g., a bowl and a stem), the typeface development platform 104 rejects the requested mapping.

In another example, the typeface development platform 104 compares the orientation angles of the component shapes. If the component shapes share a common orientation with respect to any axis, the typeface development platform 104 performs the requested mapping. For instance, in FIG. 8, the bowls of the characters 802 and 804 share the same orientation with respect to a vertical axis. If the component shapes lack a common orientation with respect to any axis, the typeface development platform 104 rejects the requested mapping. For instance, although a "t" character and an "x" character both include two intersecting stems, the stems of the "t" character are oriented at 0 and 90 degrees, while the stems of the "x" character are oriented at 45 and 135 degrees. Thus, the typeface development platform 104 would reject a requested mapping between the "t" character and the "x" character.

Examples of Model-Based Control of Typeface Design Modifications

As described in detail with respect to the various examples below, the creative apparatus 102 is also used, in some embodiments, for model-based control of typeface designs. For instance, a machine-learning model 115 is trained to recognize certain expected visual features of different typeface characters across different fonts. When a typeface manipulation application, such as the typeface processing application 106 or the typeface design application 108, receives a modification to a certain character's design, the modification is analyzed based on the trained machine-learning model 115. If the modification decreases the ability of the machine-learning model 115 to recognize the character, the typeface manipulation application notifies a user that the modification may be undesirable.

Figure 12:
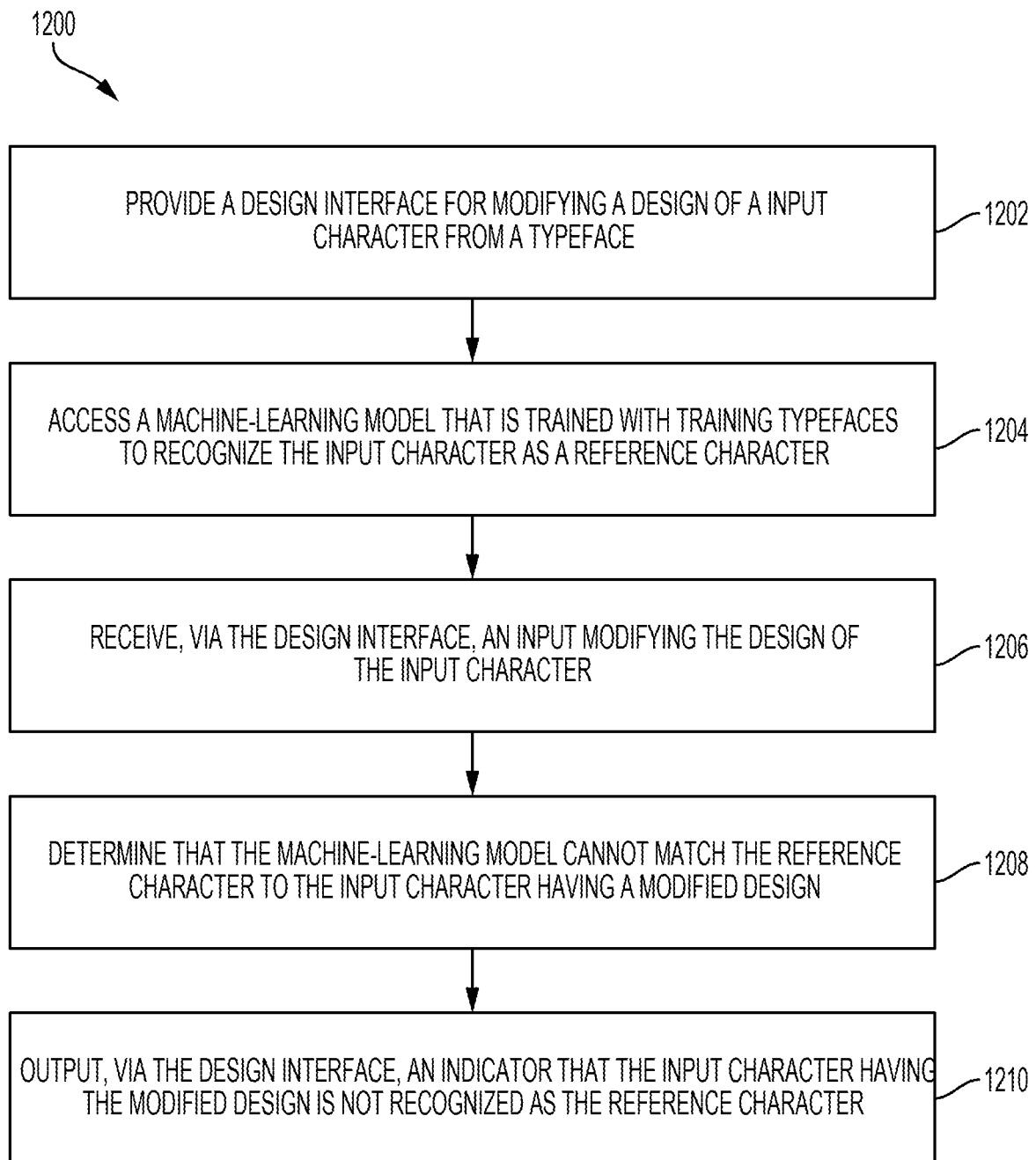
FIG. 12 depicts an example of a process for automatically controlling modifications to typeface designs using a machine-learning model, according to certain embodiments of the present disclosure.

FIG. 12 depicts an example of a process 1200 for automatically controlling modifications to typeface designs using a machine-learning model 115. In some embodiments, one or more processors of the creative apparatus 102, one or more users devices 120a-n, or some combination thereof implement operations depicted in FIG. 12 by executing suitable program code (e.g., the typeface development platform 104). For illustrative purposes, the process 1200 is described with reference to certain examples depicted in the figures. But other implementations are possible.

Figure 13:
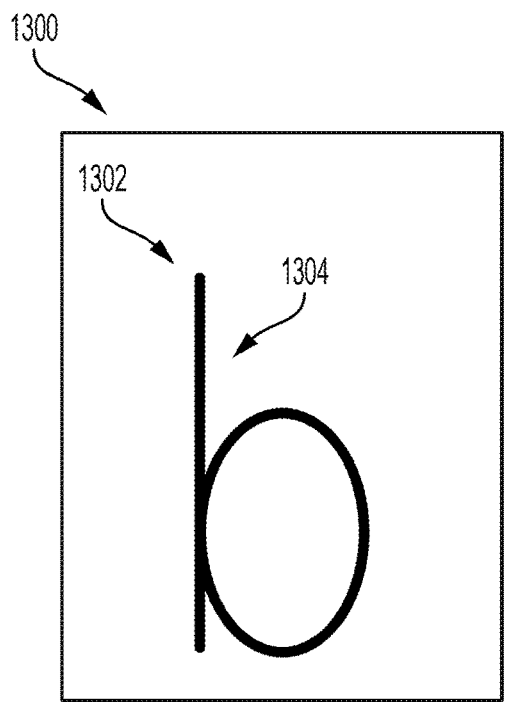
FIG. 13 depicts an example of a design interface for modifying a design of an input character in accordance with the process depicted in FIG. 12, according to certain embodiments of the present disclosure.

At block 1202, the process 1200 involves providing a design interface for modifying a design of a input character from a typeface. To implement block 1202, the typeface development platform 104 generates a graphical interface for modifying the design of one or more characters in a template typeface 114. FIG. 13 depicts an example of a design interface 1300 that is generated by the typeface development platform 104. In this example, the design interface 1300 is used to modify the design of an input character 1302 (e.g., the character "b"). For instance, the typeface development platform 104 can receive, via the design interface 1300, one or more inputs that modify the stem 1304, which is a component shape of the input character 1302.

In some embodiments, the design interface provided at block 1202 is a graphical interface used by the typeface design application 108, such as the design interface 700. But other implementations are possible. For instance, the design interface provided at block 1202 could include a preview of a development interface 300 used by the typeface processing application 106 in the process 200.

In some embodiments, providing the graphical interface involves transmitting the graphical interface from the creative apparatus 102 to one or more user devices, such as developer devices 120a-n or designer devices 112a-n. For instance, one or more processors of the creative apparatus 102 configures a transmission device of the creative apparatus 102 to transmit the graphical interface to a user device via one or more data networks 118. The creative apparatus 102 subsequently receives inputs via the data network 118 from the user device, where the inputs include (or are derived from) user input received at the user device via the graphical interface provided by the creative apparatus 102.

In additional or alternative embodiments, providing the graphical interface involves locally displaying the graphical interface at a computing system that executes the content management application. For instance, at least one processor, which is included in the creative apparatus 102 or a user device, transmits the graphical interface to a display device via a bus connecting the processor to the display device, where the display device is also included in the creative apparatus 102 or the user device. The processor subsequently receives inputs via the bus from one or more input devices (e.g., a touch screen, a mouse, etc.) that are used to interact with the graphical interface.

Returning to FIG. 12, at block 1204, the process 1200 involves accessing a machine-learning model 115 that is trained with training typefaces 116 to recognize the input character as a reference character. For instance, the typeface development platform 104 retrieves a trained machine-learning model 115 from a typeface design repository 112. Retrieving the trained machine-learning model 115 from the typeface design repository 112 can involve accessing a remote data source via a data network (e.g., a particular server device, a volume in a storage area network, network-attached storage, etc.) or a local data source via a data bus (e.g., a local non-transitory computer-readable medium that is communicatively coupled to a processing device via a data bus).

In some embodiments, a typeface training module 110 trains the machine-learning model 115. In the training process, various training typefaces 116 are accessed by the typeface training module 110 and used to train the machine-learning model 115 to categorize certain shapes as certain reference characters. For instance, the typeface training module 110 accesses different training graphics of a reference character, where each graphic is taken from a different training typeface 116. Each training graphic includes a set of Bezier curves defined by control points (e.g., Bezier curves defining a skeleton of a character, Bezier curves defining an outline of a character, etc.). The typeface training module 110 trains the machine-learning model 115 to classify each set of Bezier curves, each set of control points, or some combination thereof as the reference character.

In some embodiments, the typeface training module 110 trains the machine-learning model 115 to associate feature vectors for different typeface graphics with a certain reference character. For example, to train the machine-learning model 115 to recognize a particular reference character, the typeface development platform 104 generates feature vectors for various different graphics depicting the reference character, where different graphics are obtained from different typefaces. The feature vectors define a cluster of points in a vector space. The machine-learning model 115 is trained to associate the reference character with a region of the vector space that includes at least part of the cluster.

At block 1206, the process 1200 involves receiving, via the design interface, an input modifying the design of the input character. The input indicates one or more changes to one or more parameters of the input character (e.g., angles of stems, curvature of bowls, weight of one or more component shapes, etc.).

Figure 14:
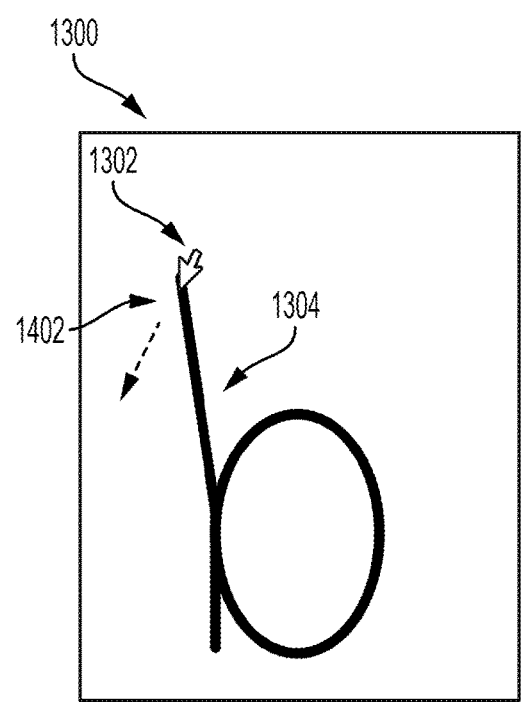
FIG. 14 depicts an example of an input that modifies the input character depicted in FIG. 13, according to certain embodiments of the present disclosure.

For example, FIG. 14 depicts an example of an input 1402 that modifies the design of the input character 1302. In this illustrative example, the input 1402 involves positioning a mouse cursor on a control point of the stem 1304, selecting the control point, and changing the angle of the stem 1304 by dragging the cursor in a given direction, as indicated by the dashed arrow in FIG. 14. However, any suitable input (e.g., clicks, pinches, scrolls, typing parameter values, etc., etc.) can be received via the design interface 1300.

In some embodiments, the input received at block 1206 involves one or more design input received by the typeface design application, as described above with respect to FIG. 7. In additional or alternative embodiments, the input received at block 1206 includes one or more tuning inputs received by the typeface processing application 106 during the process 200, as described above with respect to FIGS. 3-6. For instance, the input could involve modifying the position of a control point, modifying an expansion angle, changing the scale of a control point parameter, etc. The typeface processing application 106 generates one or more interim character graphics based on the graphics control data generated by these inputs. The typeface processing application 106 analyzes one or more of these interim character graphics using the machine-learning model 115.

Returning to FIG. 12, at block 1208, the process 1200 involves determining that the machine-learning model 115 cannot match the reference character to the input character having a modified design. For instance, the typeface development platform 104 creates a comparison version of the input character in accordance with the modified design. The comparison version of the input character is stored in a memory accessible to the typeface development platform 104. The typeface development platform 104 applies the machine-learning model 115 to the input character. For example, the typeface development platform 104 provides the comparison version of the input character, data derived from the comparison version of the input character (e.g., one or more feature vectors), or some combination thereof as input data to the machine-learning model 115. The machine-learning model 115 attempts to classify the input data as a particular reference character. If the machine-learning model 115 cannot classify the input data or classifies the input data as the incorrect reference character, the typeface design application determines that the input character having the modified design cannot be classified as the correct reference character by the machine-learning model 115. (In various embodiments, the comparison version of the input character may or may not be displayed in the design interface prior to the typeface development platform 104 applying the machine-learning model 115 to the comparison version of the input character.)

The machine-learning model 115 can be used to perform any suitable comparison of the input character having the modified design with one or more reference versions of the same character. In some embodiments, the typeface development platform 104 determines whether particular control points or sets of control points have been moved outside of a particular region defined by the machine-learning model 115. For instance, the machine-learning model 115 could be trained to classify various sets of control points from different typefaces as the relevant reference character. The input received at block 1206 could move one or more input control points from the input character from an initial position to a changed position. The initial position of the input control point is within a region bounded by various reference control points that correspond to the reference character in the machine-learning model 115. The changed position of the input control point is outside this region. The typeface development platform 104 determines, based on the input control point being outside this region, that the machine-learning model 115 cannot recognize the input character as the reference character.

In additional or alternative embodiments, the typeface development platform 104 uses the vector-based clustering described above to determine whether the input character having the modified design can be classified as the reference character using the machine-learning model 115. For example, the typeface development platform 104 generates an input feature vector from the input character having the modified design. The input feature vector defines a point in the vector space used by the machine-learning model 115. As explained in the example above with respect to block 1204, the machine-learning model 115 associates a particular region of the vector space with the reference character. If point defined by the generated input feature vector is outside this region of the vector space, the typeface development platform 104 determines that the input character having the modified design cannot be classified as the reference character using the machine-learning model 115.

At block 1210, the process 1200 involves outputting, via the design interface, an indicator that the input character having the modified design is not recognized as the reference character. To implement block 1210, the typeface development platform 104 generates an updated version of the graphical interface that includes one or more indicators that the modified design is not recognized as the reference character. Various options for these indicators include adding a warning to the graphical interface, rejecting the proposed design modification, substituting an alternative design modification, etc.

In some embodiments, the typeface development platform 104 accepts the modified design even though the modified design prevents the machine-learning model 115 from recognizing the input character as the reference character. For example, the typeface development platform 104 proceeds with updating the design interface to display the input character having the modified design. The typeface development platform 104 also presents a warning that the input character is not recognized as the reference character. Examples of the warning include a graphical indicator displayed in the typeface development platform 104, text with the warning displayed in the typeface development platform 104, an audible indicator, etc.

Figure 15:
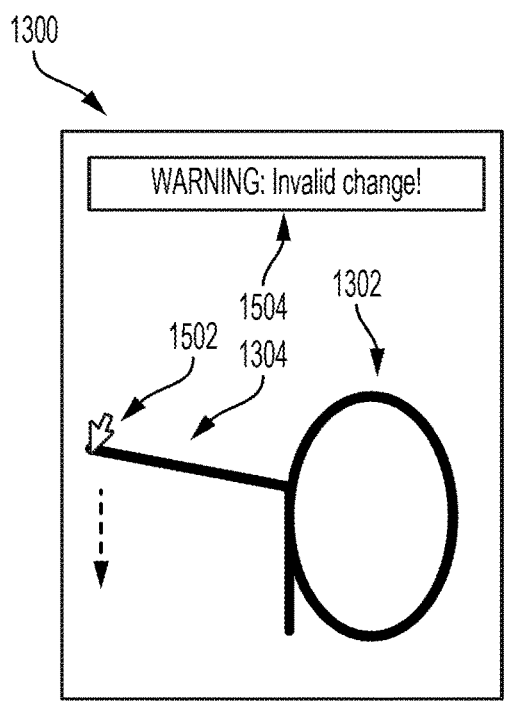
FIG. 15 depicts an example in which a design modification of the input character depicted in FIG. 13 is rejected by the process depicted in FIG. 12, according to certain embodiments of the present disclosure.

For instance, FIG. 15 depicts an example of the design interface 1300 in which an input 1502 has resulted in a modified design that prevents the machine-learning model 115 from recognizing the input character 1302 as the proper reference character. Thus, at block 1210, the typeface development platform 104 updates the interface 1300 to include the warning 1504, which notifies the user that the proposed change is "invalid." Other examples of suitable warnings include modifying one or more visual features in the interface 1300, such as highlighting a portion of the interface 1300 in which the design change occurred, and modifying one or more visual features of the input character 1302, such as changing the color of the stem 1304 to indicate that the design change has rendered the input character 1302 unrecognizable.

In additional or alternative embodiments, the typeface development platform 104 rejects the modified design if the modified design prevents the machine-learning model 115 from recognizing the input character as the reference character. In one example, the typeface development platform 104 maintains the design of the input character, as the design was displayed prior to the modification input being received. The typeface development platform 104 outputs a message or other indicator notifying a user that the modification has been rejected. In another example, the typeface development platform 104 responds to the input by applying an alternative modification to the design of the input character. For instance, if the input moves a part of the input character along a certain path (e.g., dragging a stem of the character), the typeface development platform 104 identifies different modifications of the design that correspond to different points along the path (e.g., different orientations of the stem as the stem is dragged along the path). The typeface development platform 104 analyzes one or more of these different modifications using the machine-learning model 115 to determine if the various modified designs prevent the input character from being recognizable as the reference character. The typeface development platform 104 selects, as the alternative modification to the design, the last modified design along the path of the input prior to the input character becoming recognizable (e.g., the maximum angle of the stem that allows the input character to be recognized as the reference character).

In additional or alternative embodiments, the typeface development platform 104 provides an interim warning. The interim warning indicates that a modification to a design has not yet rendered a character unrecognizable by the trained machine-learning model 115, but could do so if the modification continues. As a simplified example, if a character has a stem (e.g., a "b" character or a "h" character), a modification to the design could involve changing the angle of the stem. If the stem's angle exceeds a certain angle, the machine-learning model 115 is unable to recognize the character. The typeface development platform 104 provides an interim warning to a user that the angle has not yet been exceeded, but is close to being exceeded.

Figure 16:
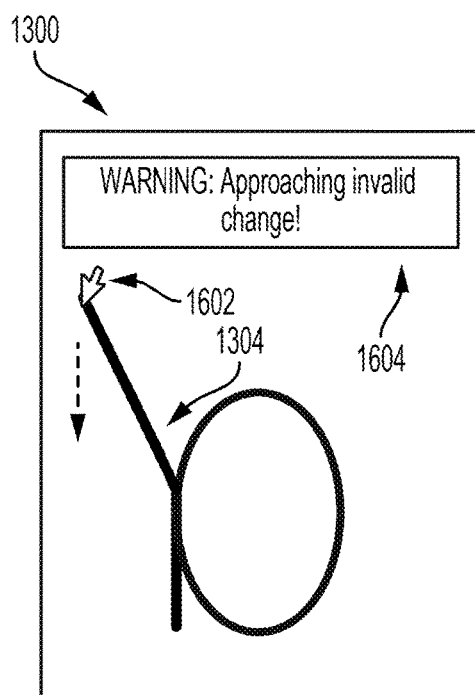
FIG. 16 depicts an example in which a design modification of the input character depicted in FIG. 13 results in a warning being outputted by the process depicted in FIG. 12, according to certain embodiments of the present disclosure.

For instance, FIG. 16 depicts an example of the design interface 1300 in which an input 1602 has resulted in a modified design that reduces the ability of the machine-learning model 115 to recognize the input character 1302 as the proper reference character. The input 1602 has modified the angle of the stem 1304 to a point that approaches the position depicted in FIG. 15. Thus, at block 1210, the typeface development platform 104 updates the interface 1300 to include the warning 1604, which notifies the user that the proposed modification is close to rendering the modified design "invalid" according to the machine-learning model 115. Other examples of suitable warnings include modifying one or more visual features in the interface 1300, such as highlighting a portion of the interface 1300 in which the design change occurred, and modifying one or more visual features of the input character 1302, such as changing the color of the stem 1304 to indicate that the design modification is close to rendering the input character 1302 unrecognizable.

The typeface development platform 104 can use the machine-learning model 115 to warn a user about any design change in a character that is likely to prevent the machine-learning model 115 from recognizing the character. For instance, the typeface development platform 104 receives an interim modification to the design of an input character. An interim modification can be a modification that does not cause the input character to be unrecognizable. The typeface development platform 104 generates an input feature vector from the input character having the design with the interim modification, as discussed above with respect to block 1206. Furthermore, as explained in the example above with respect to block 1204, the machine-learning model 115 associates a particular region of the vector space with a reference character.

The typeface development platform 104 identifies a boundary of this region. Input feature vectors defining points outside the boundary are not recognizable as the reference character. The typeface development platform 104 also identifies a threshold distance, in the vector space, from the boundary of the region. The threshold distance is used by the typeface development platform 104 to determine if an interim modification indicates a potential design change that renders the input character unrecognizable. For example, although the machine-learning model 115 matches the reference character to the input character having the design with the interim modification, the typeface design application determines that the input feature vector identifies a position in the vector space within the threshold distance from the boundary. Based on this determination, the typeface design application outputs a warning in the design interface. The warning indicates that the interim modification has reduced an ability of the machine-learning model 115 to classify, as the reference character, the input character having the interim modification.

Figure 17:
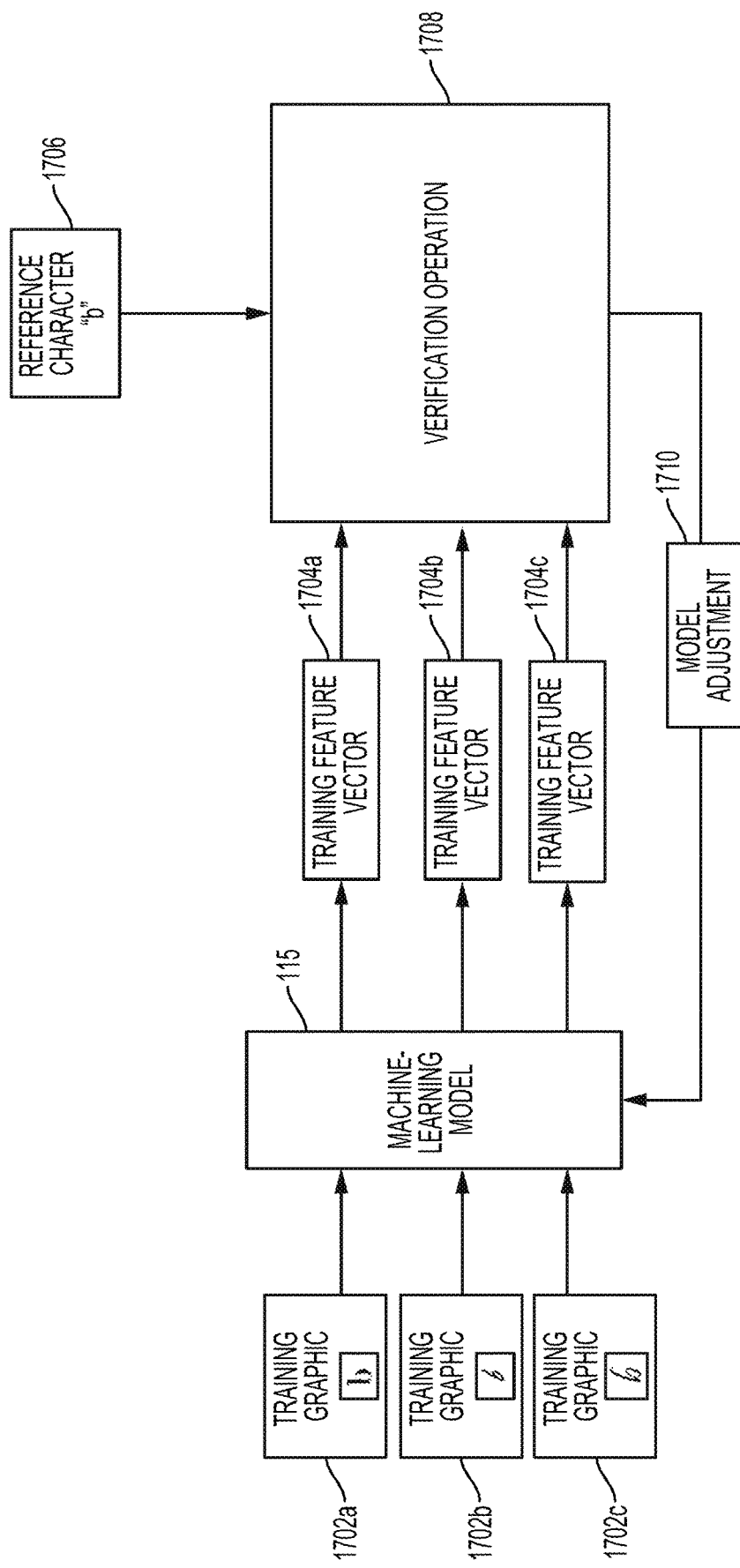
FIG. 17 depicts an example of iteratively training a machine-learning model used by the process depicted in FIG. 12, according to certain embodiments of the present disclosure.

FIG. 17 depicts an example of iteratively training a machine-learning model 115 to generate, for the training graphics 1702*a-c* depicting the same reference character 1706, a set of training feature vectors 1704*a-c* that occupy a common region of a feature vector space. The machine-learning model 115 executes one or more suitable transformation functions (e.g., neural network operations) to compute the training feature vectors 1704*a-c* from the training graphics 1702*a-c*. In this example, each training graphic includes a different typeface for the same reference character "b." Any number of training typefaces (e.g., 500-1000) may be used to train the machine-learning model 115.

In this example, the creative apparatus 102 provides data from the training graphics 1702-*a*, which are retrieved from the training typefaces 116, as inputs to a machine-learning model 115. The machine-learning model 115 includes one or more layers, each of which includes one or more nodes. Applying the machine-learning model 115 to a particular training graphic generates a corresponding training feature vector. For example, the training feature vectors 1704*a-c* are vector representations of the features from the training graphics 1702*a-c*.

Figure 18:
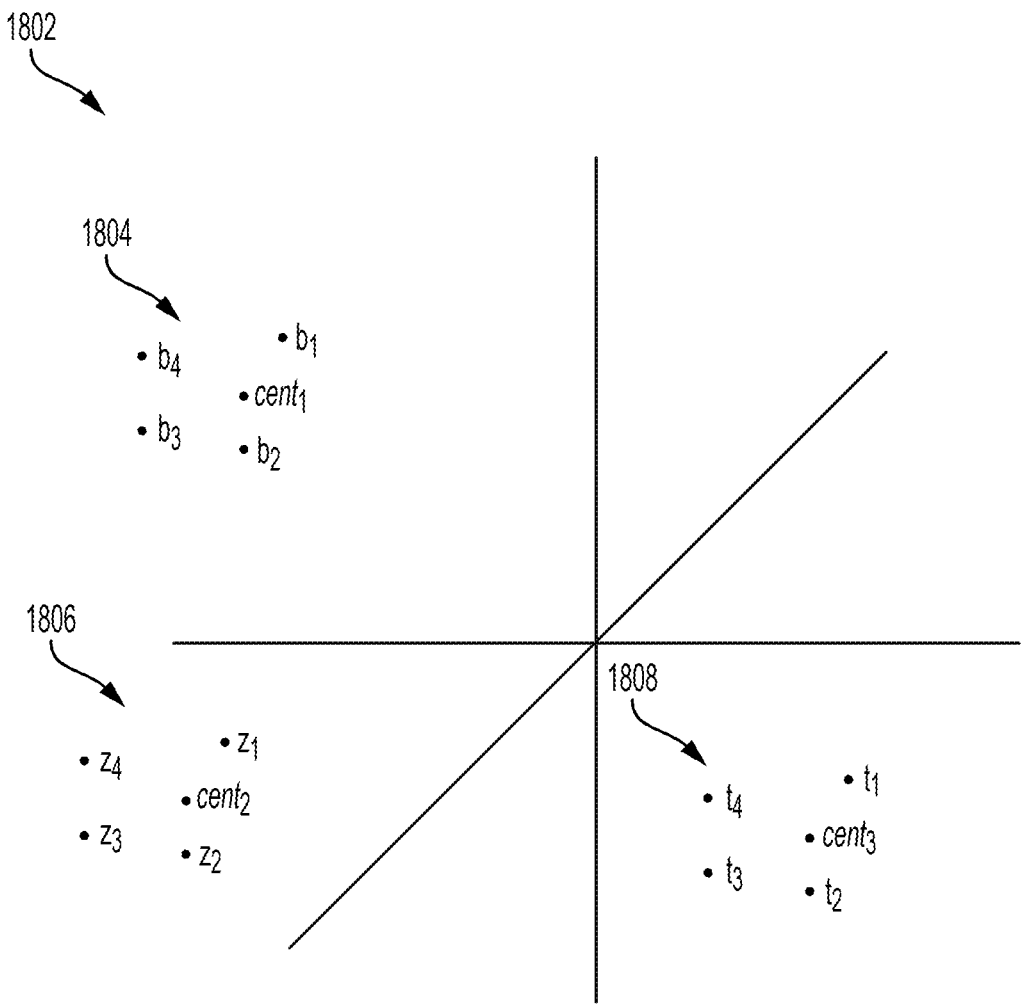
FIG. 18 depicts an example of a feature vector space used by the machine-learning model of FIG. 17, according to certain embodiments of the present disclosure.

FIG. 18 depicts an example of a feature vector space 1802 that is occupied by points that are defined by various training feature vectors. For illustrative purposes, the feature vector space 1802 is depicted as having three dimensions. But a feature vector space used by the typeface training module 110 can have any number of dimensions (e.g., the number of dimensions in each training feature vector).

The typeface training module 110 executes a verification operation 1708 that determines if the machine-learning model 115 should be adjusted. In some embodiments, the verification operation involves determining whether points in the feature vector space 1802 are sufficiently close together if these points correspond to the same reference character 1706. For instance, if the machine-learning model 115 is optimized (or otherwise adjusted) to be suitable for use by the typeface training module 110, the training feature vectors corresponding to similar component shapes should define points that are closer together in the feature vector space 1802. In the example depicted in FIG. 18, a region 1804 of the feature vector space 1802 includes a group of "b" points, which are defined by the feature vectors for various "b" character graphics, that are clustered around a first centroid. A region 1806 of the feature vector space 1802 includes a group of "z" points, which are defined by the feature vectors for various "z" character graphics, that are clustered around a second centroid. A region 1808 of the feature vector space 1802 includes a group of "t" points, which are defined by the feature vectors for various "t" character graphics, that are clustered around a third centroid.

As depicted in FIG. 18, the trained machine-learning model 115 generates, for different typefaces of the same reference character, feature vectors that define clusters of points corresponding to that reference character. For instance, four different typefaces of the "b" character result in a set of points within region 1804. Furthermore, a different region, such as the region 1806, includes a cluster of points defined by the feature vectors corresponding to different typefaces of the "z" character. Thus, the machine-learning model 115 is capable of recognizing a character that is depicted using different typefaces, and is also capable of distinguishing between two different characters even if they use the same typeface.

Returning to FIG. 17, if the verification operation 1708 identifies one or more errors in the training feature vectors (e.g., insufficiently close feature vectors, insufficiently distant feature vectors, etc.), the typeface training module 110 performs a model adjustment 1710. The model adjustment 1710 includes one or more modifications such as (but not limited to) changing the number of nodes in the machine-learning model 115, changing the number of layers in the machine-learning model 115, changing one or more mapping functions used in the machine-learning model 115, changing the number of dimensions included in a training feature vector outputted by the machine-learning model 115, etc.

Automatically controlling modifications to the typeface designs can facilitate various enhancements to a typeface design application. As one example, one or more embodiments described above can allow for automatic suggestions on manipulating various typography parameters (e.g., weight, width, contrast, oblique, curviness, x-height, taper and tracking). As another example, one or more embodiments described above can allow for automatic suggestions on manipulating serifs of font including width, height, bracket radius, bracket angle and slab angle.

Examples of Selectively Enabling Trackpad Functionality in Graphical Interfaces

In some embodiments, a creative apparatus 102 or other computing system implements a trackpad functionality. For instance, certain content management applications such as (but not limited to) a typeface design application may be executed on devices with smaller display screens. The trackpad functionality can improve an end-user experience on these devices by toggling a graphical interface, such as (but not limited to) a typeface design interface, between a trackpad mode and a non-trackpad mode. In a trackpad mode, an input area of a graphical interface other than an active control element (e.g., a selected control point) are configured to ignore inputs to other control elements and treat the input area as a trackpad that affects the active control element. In the non-trackpad mode, the various control elements are enable according to their standard functionality.

Figure 19:
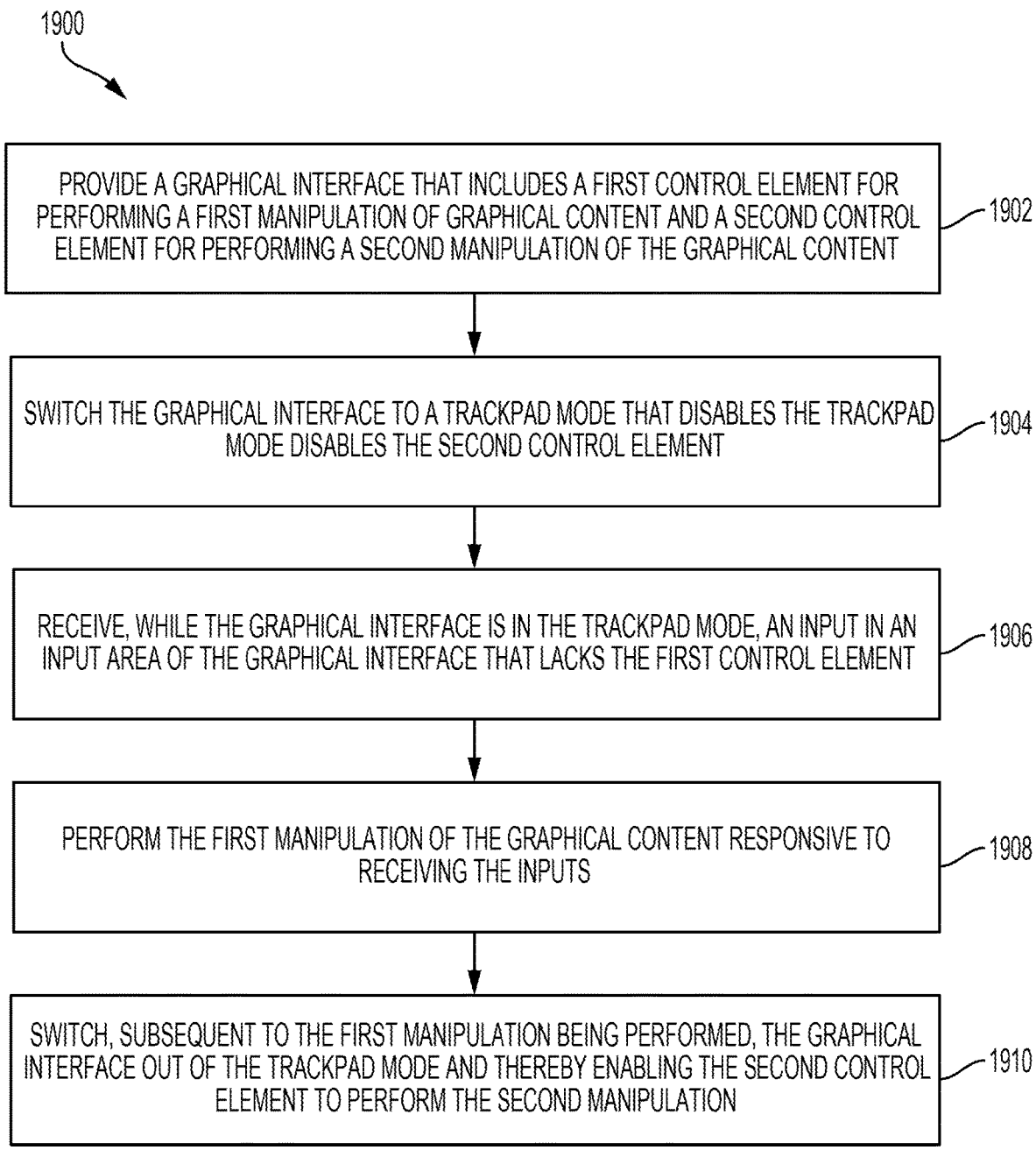
FIG. 19 depicts an example of a process for selectively enabling trackpad functionality in graphical interfaces, according to certain embodiments of the present disclosure.

FIG. 19 depicts an example of a process 1900 for selectively enabling trackpad functionality in graphical interfaces. In some embodiments, one or more processors of the creative apparatus 102, one or more users devices 120a-n, or some combination thereof implement operations depicted in FIG. 19 by executing suitable program code (e.g., the typeface design application 108 of the typeface development platform 104, a separate content management application, etc.). For illustrative purposes, the process 1900 is described with reference to certain examples depicted in the figures. But other implementations are possible.

At block 1902, the process 1900 involves providing a graphical interface that includes a first control element for performing a first manipulation of graphical content and a second control element for performing a second manipulation of the graphical content. For instance, a content management application, such as a typeface development platform 104 having a typeface design application 108, generates a graphical interface for manipulating one or more types of graphical content. Examples of graphical content include combinations of shapes (e.g., a set of curves used to define a character in a template typeface 114), text, image content, etc. One or more regions of the graphical interface display the graphical content. One or more regions of the graphical interface also include control elements. Examples of control elements include control points along curves, buttons, selectable areas (e.g., selectable text), text cursors, etc.

In some embodiments, providing the graphical interface involves transmitting the graphical interface from the creative apparatus 102 to one or more user devices 120a-n. For instance, one or more processors of the creative apparatus 102 configures a transmission device of the creative apparatus 102 to transmit the graphical interface to a user device via a data network 118. The creative apparatus 102 subsequently receives inputs via the data network 118 from the user device, where the inputs include (or are derived from) user input received at the user device via the graphical interface provided by the creative apparatus 102. In additional or alternative embodiments, providing the graphical interface involves locally displaying the graphical interface at a computing system that executes the content management application. For instance, at least one processor, which is included in the creative apparatus 102 or a user device, transmits the graphical interface to a display device via a bus connecting the processor to the display device, where the display device is also included in the creative apparatus 102 or the user device. The processor subsequently receives inputs via the bus from one or more input devices (e.g., a touch screen, a mouse, etc.) that are used to interact with the graphical interface.

At block 1904, the process 1900 involves switching the graphical interface to a trackpad mode that disables the second control element and thereby prevents the second control element from performing the second manipulation. For instance, the content management application (e.g., the typeface development platform 104 having the typeface design application 108) generates an updated version of the graphical interface in which control elements are enabled or disabled in accordance with the trackpad mode.

FIG. 20 depicts an example of a graphical interface 2000 in which the graphical content is a character 2002 from one of the template typefaces 114. The graphical interface 2000 includes a trackpad region 2001 in which the character 2002 is displayed. The character 2002 includes various control points, such as control points 2004 and 2006, as well as various curves that are defined with respect to the control points. For instance, the control point 2004 is located in the middle of one curve, and the control point 2006 is located in the middle of another curve. One or more of the control elements displayed in the trackpad region 2001, which include the control points 2004 and 2006, can be selectively disabled if the graphical interface 2000 is switched to a trackpad mode.

In some embodiments, a graphical interface having a trackpad region also includes a non-trackpad region. Additional control elements are located in the non-trackpad region. The graphical interface maintains the functionality of these additional control elements located in the non-trackpad region regardless of whether the graphical interface is in the trackpad mode. For instance, in this example depicted in FIG. 20, the graphical interface 2000 also includes a non-trackpad region 2008. The non-trackpad region 2008 includes additional control elements 2010, such as an "undo" button, an "upload" button, etc. The control elements included in the non-trackpad region 2008 are not affected by the trackpad mode. Thus, the graphical interface maintains the functionality of these control elements (e.g., the "undo" button, the "upload" button, etc.) both in the trackpad mode and out of the trackpad mode.

In some embodiments, the typeface design application 108 switches the graphical interface to a trackpad mode responsive to a selection of the first control element. In one example that involves modifying typeface designs, the graphical interface is switched to the trackpad mode responsive to receiving a selection of one or more first control points (i.e., the first control element of block 1902). For instance, FIG. 21 depicts an example in which a selection of a control point 2006 causes the graphical interface 2000 to be switched into a trackpad mode. For illustrative purposes, the selection of the control point 2006 is depicted using a cursor input 2102 and the control point 2006 being enlarged and changing color. But any suitable input (e.g., a touch input such as a double-tap) can select a control element, and any suitable visual indicator can be used to identify a control element that remains enabled in the trackpad mode.

Returning to FIG. 19, at block 1906, the process 1900 involves receiving, while the graphical interface is in the trackpad mode, an input in an input area of the graphical interface that lacks the first control element. For instance, the content management application detects or otherwise receives one or more input events via the graphical interface. The input events are generated by interactions occurring in the input area of the graphical interface. An input area includes any portion of the graphical interface having event-based code (e.g., event listeners, event handlers, event sources, etc.) used to generate input events. Examples of input events include touch events (e.g., taps, swipes, etc.), dragging inputs, mouse clicks, typing inputs (e.g., tabs or spaces), etc.

In embodiments involving a cloud-based or other remote content management application (e.g., a typeface development platform 104), receiving the input involves a computing system such as the creative apparatus 102 communicating with one or more user devices and thereby receiving inputs via a data network 118. For instance, one or more processors of the creative apparatus 102 configures a receiver device of the creative apparatus 102 to receive communications from a user device via a data network 118 (e.g., during a session established between the typeface design application 108 and a client application on the user device). The receiving device receives the communications via the data network 118, and the processor obtains data describing the inputs from communication. The inputs include (or are derived from) user input received at the user device via the graphical interface. In additional or alternative embodiments, receiving the inputs involves locally communicating the inputs from an input device of a local computing system (e.g., a tablet) to a processor of the same computing system via a bus. For instance, at least one input device, which is included in a local creative apparatus 102 or a user device, is used to interact with the graphical interface as displayed on a display device. These interactions are captured as inputs that are provided to a processor via a bus connecting the processor to the input device.

At block 1908, the process 1900 involves performing the first manipulation of the graphical content responsive to receiving the inputs. In some embodiments, a content management application, such as the typeface processing application 106 or the typeface design application 108, responds to the inputs by updating the graphical interface. To update the graphical interface, the content management application moves the first control element in a manner that is responsive to the input received at block 1906. Moving the first control element causes a corresponding manipulation of the graphical content to be performed.

For instance, FIG. 22 depicts an example of receiving an input in the trackpad mode that implements a corresponding manipulation of the graphical content. In this example, an input 2202 is received in an input area (i.e., a portion of the trackpad region 2001) that includes various other control points, such as the disabled control point 2004. The input 2202 is a dragging motion in the input area, which is represented by the dashed arrow in FIG. 22. The typeface design application 108 responds to the input 2202 by performing the manipulation 2204. The manipulation 2204 involves moving the control point 2006 along a path, indicated by another dashed arrow in FIG. 22, that corresponds to the input 2202. Moving the control point 2006 causes the curve with the control point 2006 to be lengthened. (For illustrative purposes, FIG. 22 depicts input 2202 using a mouse cursor, but a touch input or other input without a mouse cursor could also be used.)

The trackpad mode allows other areas of the trackpad region to be used for inputs that affect an active control element, even if those areas of the trackpad region include other control elements that would otherwise be affected by inputs received in those areas. In one example, a first control element is active while the graphical interface is in a trackpad mode. An area that includes a second control element, which is disabled, receives an input. The typeface design application 108 applies the received input to the first control element (i.e., the active control element) rather than the second control element (i.e., the disabled control element). For instance, in the example of FIG. 22, the input 2202 includes a path that crosses the control point 2004. But the input 2202 is applied to the control point 2006 rather than the control point 2004, since the control point 2004 is disabled while the control point 2006 is active and the interface 2000 is in the trackpad mode.

At block 1910, the process 1900 involves switching, subsequent to the first manipulation being performed, the graphical interface out of the trackpad mode and thereby enabling the second control element to perform the second manipulation. To implement block 1910, the content management application detects one or more inputs or other events (e.g., a timer expiration, a selection of a different active window, etc.) indicating that the trackpad mode should be deactivated. The content management application responds to the input or other event by enabling one or more control elements that were disabled in the trackpad mode.

In some embodiments, at least one input used to perform a manipulation is also used to indicate that that the trackpad mode should be deactivated. In this manner, the content management application enters and exits the trackpad mode in a manner that is specific to a certain content manipulation. For instance, if the trackpad mode is enabled responsive to a particular control element being selected (e.g., clicking on a control point in FIG. 21), then the trackpad mode is disabled responsive to a completion of a particular manipulation involving that control element. For instance, the input to perform a manipulation could be a dragging input, which involves a start input (e.g., pressing a mouse button or making contact with a touchscreen), a movement input, and an end input (e.g., releasing mouse button or ceasing contact with the touchscreen). The content management application can respond to detecting the end input by completing the manipulation and deactivating (i.e., exiting) the trackpad mode.

In additional or alternative embodiments, independent inputs or events are used to indicate that that the trackpad mode should be deactivated. In one example, if the trackpad mode is enabled responsive to a particular control element being selected (e.g., performing a first click on a control point in FIG. 21), then the trackpad mode is disabled responsive to that control element being de-selected (e.g., performing a second click on the control point). In another example, the trackpad mode can be deactivated by receiving a certain "cancel" command (e.g., an "escape" keystroke, clicking on a "back" button, etc.). In another example, the trackpad mode can be deactivated responsive to some other event, such as a timer being initiated when the trackpad mode is activated or an input is received in the trackpad mode, and the timer expiring without another input being received in the trackpad mode. In another example, the trackpad mode can be deactivated responsive to an event indicating that a user's attention has shifted, such as selection of a different application or other window as the active window on a display device.

The trackpad mode can be implemented in any suitable manner. In some embodiments, activating the trackpad mode involves deactivating event-based code (e.g., event listeners, event handlers, event sources, etc.) associated with disabled control elements. For instance, in the example depicted in FIGS. 20-22, event-based code for control point 2004 is enabled in the non-trackpad mode. The event-based code responds to events that involve a manipulation of the control point. This event-based code for control point 2004 is disabled in the trackpad mode. Thus, a content management application that uses the graphical interface 2000 does not recognize "clicks" or other events that may occur with respect to the control point 2004. In additional or alternative embodiments, the trackpad mode involves activating specialized event-based code (e.g., event listeners, event handlers, event sources, etc.) associated with enabled control elements. For instance, in the example depicted in FIGS. 20-22, event-based code for control point 2006 is enabled in the trackpad mode. The event-based code listens for events that occur throughout the trackpad region 2001 (e.g., a dragging input) and executes applicable procedures (e.g., movement of the control point 2006) in response to the events.

FIGS. 23-25 depict another example of using the process 1900. In this example, FIG. 23 depicts a graphical interface 2302 for an email application, where the graphical interface 2302 includes a non-trackpad region 2304 and a trackpad region 2306. The trackpad region 2306 displays graphical content that includes visual representations 2310, 2312,

2314, and 2316. The visual representations 2310, 2312, 2314, and 2316 correspond to different email messages, where each visual representation is a row identifying the message's sender, subject, and receipt date. The visual representations 2310, 2312, 2314, and 2316 can be (or include) control elements. For instance, moving or otherwise manipulating a control element causes a change with respect to the represented message. For instance, moving a message's control element (e.g., a visual representation of the message) to the "delete" icon 2308 causes the message to be deleted.

In FIG. 24, the graphical interface 2302 receives an input 2402 that causes a suitable content manipulation application (e.g., an email application) to switch the graphical interface 2302 into a trackpad mode. In this example, the input 2402 involves selecting the visual representation 2310 (e.g., using a double-click or other input indicating that the trackpad mode should be activated). Switching the graphical interface 2302 into a trackpad mode causes inputs that are received in various areas of the trackpad region (e.g., inputs where visual representations 2312, 2314, or 2316 are located) to be applied to an active control element (i.e., the visual representation 2310). For example, FIG. 25 depicts a dragging input 2502 that starts by clicking on an area of the graphical interface 2302 in which the visual representation 2312 is located. The dragging input 2502 ends at an area of the graphical interface 2302 in which the visual representation 2316 is located. (For illustrative purposes, FIG. 25 depicts the input 2502 using a mouse cursor, but a touch input or other input without a mouse cursor could also be used.) The trackpad mode disables the control elements for the visual representations 2312, 2314, and 2316. Therefore, the dragging input is applied to the active control element (i.e., the visual representation 2310), which causes the visual representation 2310 to be moved to the "delete" icon 2308.

Figure 26:
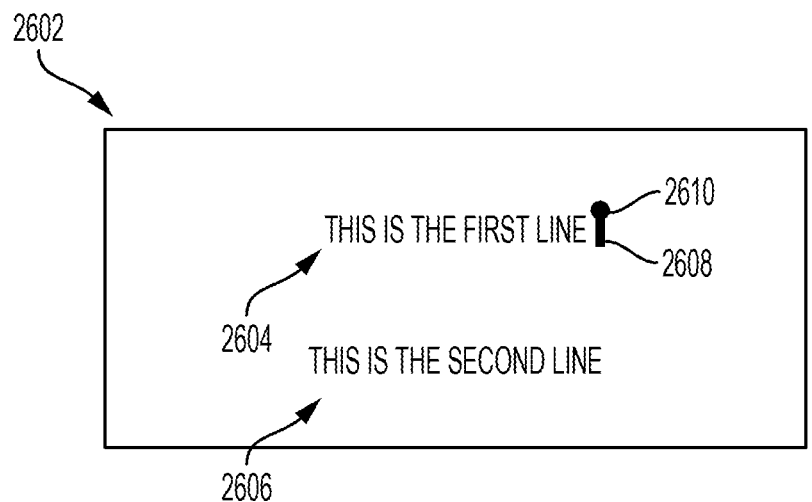
FIG. 26 depicts a graphical interface for a text editor that uses the trackpad functionality from the process of FIG. 19, according to certain embodiments of the present disclosure.
Figure 27:
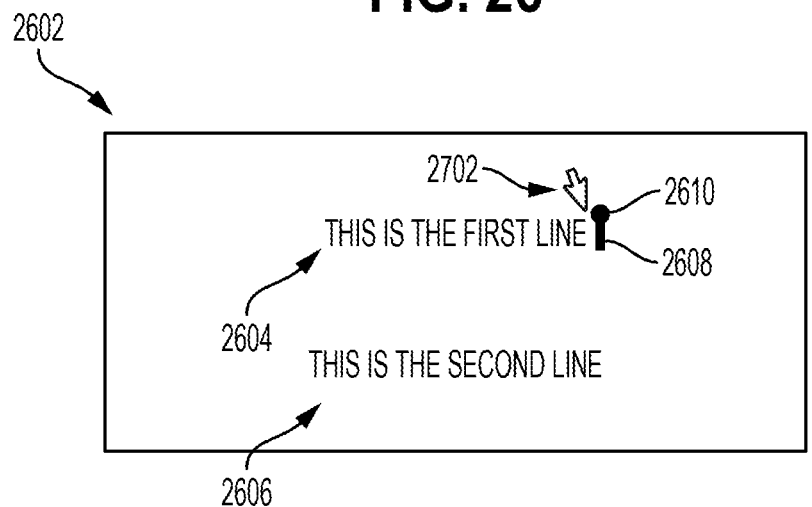
FIG. 27 depicts an example in which the graphical interface of FIG. 26 is switched into a trackpad mode in accordance with the process of FIG. 19, according to certain embodiments of the present disclosure.
Figure 28:
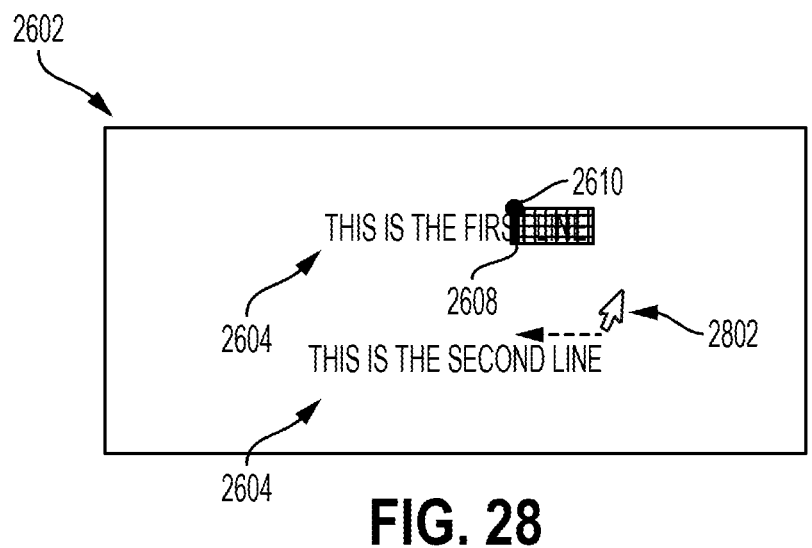
FIG. 28 depicts an example of manipulating email content using the trackpad functionality enabled in FIG. 27, according to certain embodiments of the present disclosure.

FIGS. 26-28 depict another example of using the process 1900. In this example, FIG. 26 depicts a graphical interface 2602 that displays graphical content, which includes text line 2604 and text line 2606. The graphical interface 2602 also includes control elements, such as a cursor 2608 having an end 2610. Another example of a control element includes selectable text. For instance, in the non-trackpad mode, any point on the text line 2606 can receive a touch input that causes a particular character to be selected.

In FIG. 27, the graphical interface 2602 receives an input 2702 that causes a suitable content manipulation application (e.g., a text editing application) to switch the graphical interface 2602 into a trackpad mode. The input 2702 could include, for example, receiving a double-click or double-tap on the end 2610 of the cursor 2608. (Although FIG. 27 depicts the input 2702 using a mouse cursor, a touch input or other input without a mouse cursor could also be used.) Switching the graphical interface 2602 into a trackpad mode causes inputs that are received in various areas of the graphical interface 2602 (e.g., a touch input on the text line 2606) to be applied to an active control element (i.e., the cursor 2608). For example, FIG. 28 depicts a dragging input 2802 that moves along the text line 2606.

The trackpad mode disables one or more control elements that would otherwise apply this dragging input 2802 to the text line 2606. For instance, in the non-trackpad mode, a content management application that displays the interface 2602 would execute event-specific code for listening to events involving the displayed text of the text line 2604, such as clicks, drags, keyboard inputs, etc. In the trackpad mode, the content management application disables this event-specific code, executes alternative event-specific code that ignores inputs affecting the text of the line 2606, or some combination thereof. The alternative event-specific code manages events that involve inputs in the region of the graphical interface 2602 to be applied to an active element in a trackpad mode, such as the cursor 2608. Because the content management application executes the alternative event-specific code, the dragging input 2802 is applied to the active control element (i.e., the cursor 2608), which causes the cursor to move along the path of the text line 2604 instead of the text line 2606, thereby selecting the text line 2604 via the dragging input 2802 received in the trackpad mode.

Example of a Computing System for Implementing Various Embodiments

Figure 29:
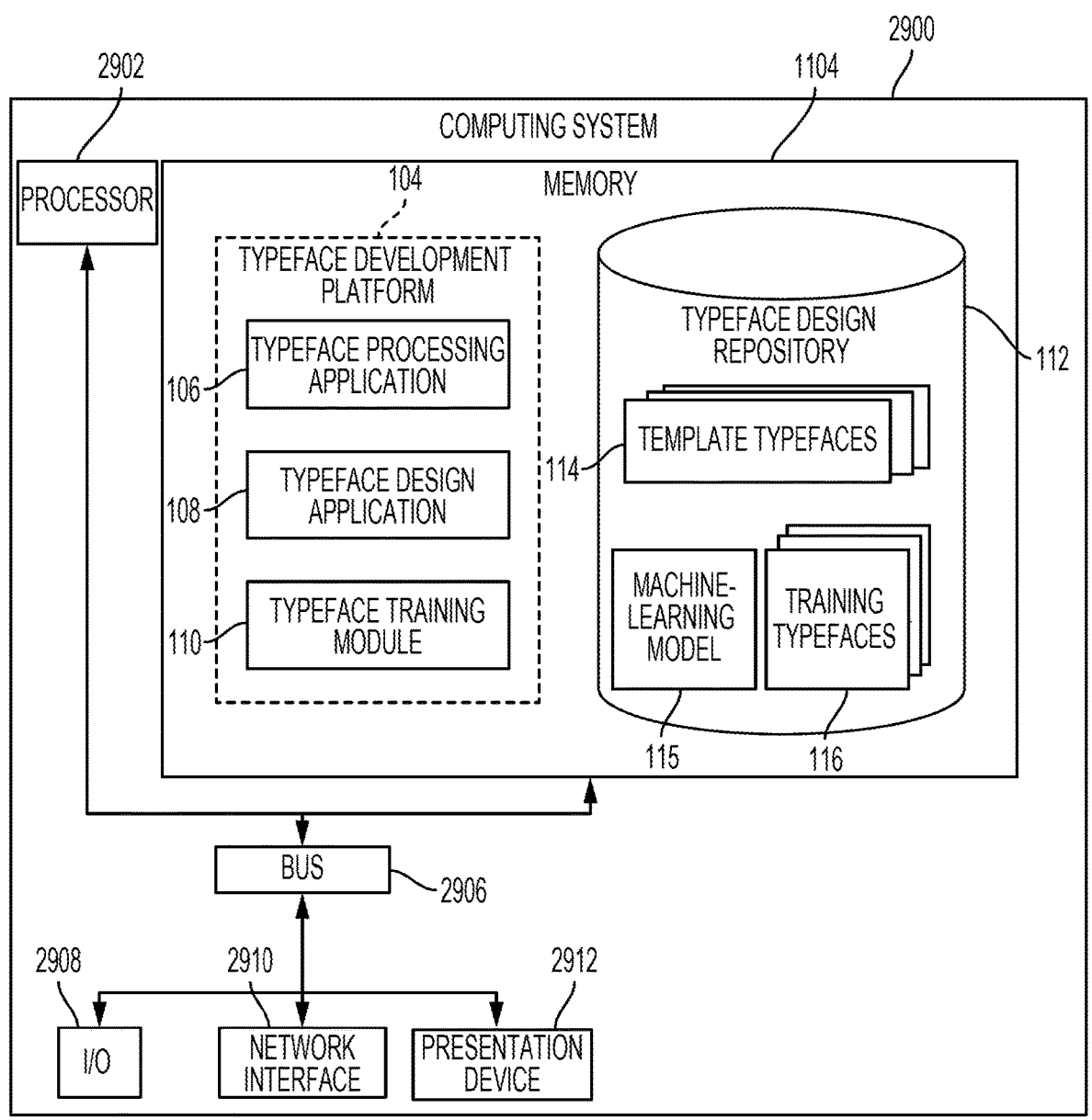
FIG. 29 depicts an example of a computing system for implementing one or more embodiments described herein.

Any suitable computing system or group of computing systems can be used for performing the operations described herein. For example, FIG. 29 depicts an example of a computing system 2900 for implementing one or more embodiments of this disclosure. In some embodiments, the computing system 2900 is the creative apparatus 102, and includes all of the computing modules and datasets depicted in FIG. 29. In other embodiments, different computing systems (e.g., a creative apparatus 102 and one or more user devices) having devices similar to those depicted in FIG. 29 (e.g., a processor, a memory, etc.) execute different subsets of the modules depicted in FIG. 29, execute alternative applications (e.g., content management applications other than a typeface design application), store different subsets of the datasets depicted in FIG. 29, or some combination thereof.

The depicted example of a computing system 2900 includes a processor 2902 communicatively coupled to one or more memory devices 2904. The processor 2902 executes computer-executable program code stored in a memory device 2904, accesses information stored in the memory device 2904, or both. Examples of the processor 2902 include a microprocessor, an application-specific integrated circuit ("ASIC"), a field-programmable gate array ("FPGA"), or any other suitable processing device. The processor 2902 can include any number of processing devices, including a single processing device.

The memory device 2904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 2900 may also include a number of external or internal devices, such as input or output devices. For example, the computing system 2900 is shown with one or more input/output ("I/O") interfaces 2908. An I/O interface 2908 can receive input from input devices (e.g., a mouse, a touchscreen, a keyboard, a microphone, etc.) or provide output to output devices (e.g., a display device, a touchscreen, a speaker, etc.). One or more buses 2906 are also included in the computing system 2900. The bus 2906 communicatively couples one or more components of a computing system 2900.

The computing system 2900 executes program code that configures the processor 2902 to perform one or more of the operations described herein. The program code includes, for example, the typeface development platform 104, one or more of its component modules (e.g., the typeface processing application 106, the typeface design application 108, the typeface training module 110, etc.), or other suitable applications that perform one or more operations described herein. The program code may be resident in a memory device 2904 or any suitable computer-readable medium and may be executed by the processor 2902 or any other suitable processor. In some embodiments, the program code is stored in the memory device 2904, as depicted in FIG. 29. In additional or alternative embodiments, the program code described above is stored in one or more other memory devices accessible via a data network.

The computing system 2900 can access various data objects and data structures, such as the template typefaces 114, the machine-learning model 115, and the training typefaces 116. These data objects and data structures, the use of which is described above, can be accessed in any suitable manner. In some embodiments, some or all of these data objects and data structures are stored in the memory device 2904, as in the example depicted in FIG. 29. For example, a computing system 2900 that executes the typeface development platform 104 can provide external systems with access to the template typefaces 114, the machine-learning model 115, or other data stored in the typeface design repository 112.

In additional or alternative embodiments, some or all of these data objects and data structures are stored in the same memory device (e.g., one of the memory device 2904). For example, a common computing system, such as the creative apparatus 102 depicted in FIG. 1, can host the typeface development platform 104 and store one or more of the datasets included in the typeface design repository 112. In additional or alternative embodiments, some or all of these data objects and data structures are stored in one or more other memory devices accessible via a data network.

The computing system 2900 also includes a network interface device 2910. The network interface device 2910 includes any device or group of devices suitable for establishing a wired or wireless data connection to one or more data networks. Non-limiting examples of the network interface device 2910 include an Ethernet network adapter, a modem, and/or the like. The computing system 2900 is able to communicate with one or more other computing devices (e.g., a computing device executing an typeface development platform 104) via a data network using the network interface device 2910.

In some embodiments, the computing system 2900 also includes the presentation device 2912 depicted in FIG. 29. A presentation device 2912 can include any device or group of devices suitable for providing visual, auditory, or other suitable sensory output. Non-limiting examples of the presentation device 2912 include a touchscreen, a monitor, a speaker, a separate mobile computing device, etc. In some aspects, the presentation device 2912 can include a remote client-computing device, such as a user device depicted in FIG. 1, that communicates with the computing system 2900 using one or more data networks described herein. Other aspects can omit the presentation device 2912.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for selectively enabling trackpad functionality in graphical interfaces, the method comprising:
   providing, by a content manipulation application executed by one or more processing devices, a graphical interface for editing graphical content, the graphical interface having a first control element for performing a first manipulation of the graphical content and a second control element for performing a second manipulation of the graphical content;
   switching, responsive to a selection of the first control element, the graphical interface to a trackpad mode, wherein the trackpad mode disables the second control element and thereby prevents the second control element from performing the second manipulation, and wherein the second control element remains disabled while additional inputs are provided in the graphical interface until the graphical interface is switched out of the trackpad mode;

receiving, while the graphical interface is in the trackpad mode, an input separate from the selection of the first element in an input area of the graphical interface that lacks the first control element;

performing the first manipulation of the graphical content responsive to receiving the input in the input area of the graphical interface that lacks the first control element; and switching, subsequent to the first manipulation being performed, the graphical interface out of the trackpad mode and thereby enabling the second control element to perform the second manipulation.

2. The method of claim 1, wherein:
the graphical content comprises a character from a typeface,
the first control element is a first control point;
the first manipulation comprises modifying a curve with the first control point;
the second control element is a second control point; and
the second manipulation comprises modifying a curve with the second control point.

3. The method of claim 2, wherein the graphical interface is switched to the trackpad mode responsive to receiving, via the graphical interface, a selection of the first control point,
wherein the graphical interface is switched out of the trackpad mode responsive to receiving, via the graphical interface, a de-selection of the first control point.

4. The method of claim 3, wherein the de-selection of the first control point comprises a selection of the second control point.

5. The method of claim 1, wherein the content manipulation application updates the graphical interface to move the first control element responsive to the input, wherein moving the first control element implements the first manipulation.

6. The method of claim 1, where the input area includes the second control element, wherein the input is applied to the first control element rather than the second control element.

7. The method of claim 1, wherein the graphical interface comprises (i) a trackpad region in which the first control element and the second control element are located and (ii) a non-trackpad region in which a third control element is located, wherein the graphical interface maintains a functionality of the third control element both in the trackpad mode and out of the trackpad mode.

8. A system comprising:
a processing device; and
a non-transitory computer-readable medium communicatively coupled to the processing device, wherein the processing device is configured to execute a content manipulation application stored in the non-transitory computer-readable medium and thereby perform operations comprising:
providing a graphical interface for editing graphical content, the graphical interface displaying (a) a first control element for performing a first manipulation of the graphical content, (b) an input area that lacks the first control element, and (c) a second control element for performing a second manipulation of the graphical content, switching, responsive to a selection of the first control element, the graphical interface to a trackpad mode, wherein the trackpad mode disables the second control element and thereby prevents the second control element from performing the second manipulation, and wherein the second control element remains disabled while additional inputs are provided in the graphical interface until the graphical interface is switched out of the trackpad mode, receiving, while the graphical interface is in the trackpad mode, an input separate from the selection of the first element in the input area of the graphical interface that lacks the first control element, performing the first manipulation of the graphical content responsive to receiving the input in the input area of the graphical interface that lacks the first control element, and switching, subsequent to the first manipulation being performed, the graphical interface out of the trackpad mode and thereby enabling the second control element to perform the second manipulation.

9. The system of claim 8, wherein:
the graphical content comprises a character from a typeface,
the first control element is a first control point;
the first manipulation comprises modifying a curve with the first control point;
the second control element is a second control point; and
the second manipulation comprises modifying a curve with the second control point.

10. The system of claim 9, wherein the processing device is configured for switching the graphical interface to the trackpad mode responsive to receiving, via the graphical interface, a selection of the first control point,
wherein the processing device is configured for switching the graphical interface out of the trackpad mode responsive to receiving, via the graphical interface, a de-selection of the first control point.

11. The system of claim 10, wherein the de-selection of the first control point comprises a selection of the second control point.

12. The system of claim 8, wherein the processing device is configured for updating the graphical interface to move the first control element responsive to the input, wherein moving the first control element implements the first manipulation.

13. The system of claim 8, where the input area includes the second control element, wherein the input is applied to the first control element rather than the second control element.

14. The system of claim 8, wherein the graphical interface comprises (i) a trackpad region in which the first control element and the second control element are located and (ii) a non-trackpad region in which a third control element is located, wherein the graphical interface is configured for maintaining a functionality of the third control element both in the trackpad mode and out of the trackpad mode.

15. A non-transitory computer-readable medium having program code of a content management application that is stored thereon and that is executable by one or more processing devices for performing operations comprising:

providing a graphical interface for editing graphical content, the graphical interface having a first control element for performing a first manipulation of the graphical content and a second control element for performing a second manipulation of the graphical content;

switching, responsive to a selection of the first control element, the graphical interface to a trackpad mode, wherein the trackpad mode disables the second control element and thereby prevents the second control element from performing the second manipulation, and wherein the second control element remains disabled while additional inputs are provided in the graphical interface until the graphical interface is switched out of the trackpad mode;

receiving, while the graphical interface is in the trackpad mode, an input separate from the selection of the first element in an input area of the graphical interface that lacks the first control element;

performing the first manipulation of the graphical content responsive to receiving the input in the input area of the graphical interface that lacks the first control element; and switching, subsequent to the first manipulation being performed, the graphical interface out of the trackpad mode and thereby enabling the second control element to perform the second manipulation.

16. The non-transitory computer-readable medium of claim 15, wherein:

the graphical content comprises a character from a typeface, the first control element is a first control point;

the first manipulation comprises modifying a curve with the first control point;

the second control element is a second control point; and the second manipulation comprises modifying a curve with the second control point.

17. The non-transitory computer-readable medium of claim 16, wherein the graphical interface is switched to the trackpad mode responsive to receiving, via the graphical interface, a selection of the first control point, wherein the graphical interface is switched out of the trackpad mode responsive to receiving, via the graphical interface, a de-selection of the first control point.

18. The non-transitory computer-readable medium of claim 15, wherein the operations further comprise updating the graphical interface to move the first control element responsive to the input, wherein moving the first control element implements the first manipulation.

19. The non-transitory computer-readable medium of claim 15, where the input area includes the second control element, wherein the input is applied to the first control element rather than the second control element.

20. The non-transitory computer-readable medium of claim 15, wherein the graphical interface comprises (i) a trackpad region in which the first control element and the second control element are located and (ii) a non-trackpad region in which a third control element is located, wherein the operations further comprise maintaining a functionality of the third control element both in the trackpad mode and out of the trackpad mode.

* * * * *